(12) United States Patent
Kim

(10) Patent No.: US 11,803,624 B2
(45) Date of Patent: Oct. 31, 2023

(54) ELECTRONIC DEVICE AND METHOD FOR ACQUIRING FINGERPRINT INFORMATION THEREOF

(71) Applicant: Samsung Electronics Co., Ltd., Suwon-si (KR)

(72) Inventor: Jinho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/837,728

(22) Filed: Jun. 10, 2022

(65) Prior Publication Data

US 2023/0027825 A1  Jan. 26, 2023

Related U.S. Application Data

(63) Continuation of application No. PCT/KR2022/007502, filed on May 26, 2022.

(30) Foreign Application Priority Data

Jul. 23, 2021 (KR) .................. 10-2021-0097280

(51) Int. Cl.
*G06F 21/32* (2013.01)
*G06V 40/50* (2022.01)
(Continued)

(52) U.S. Cl.
CPC .......... *G06F 21/32* (2013.01); *G06V 40/1318* (2022.01); *G06V 40/1376* (2022.01); *G06V 40/50* (2022.01)

(58) Field of Classification Search
CPC G06F 21/32; G06V 40/1318; G06V 40/1376; G06V 40/50
See application file for complete search history.

(56) References Cited

U.S. PATENT DOCUMENTS 10,049,256 B2  8/2018  Wu
10,528,786 B2  1/2020  Lee et al.
(Continued)

FOREIGN PATENT DOCUMENTS

CN  106874828 A  6/2017
CN  113177516 A  7/2021
(Continued)

OTHER PUBLICATIONS

International Search Report dated Sep. 1, 2022, issued in International Patent Application No. PCT/KR2022/007502.

*Primary Examiner* — Abhishek Sarma
(74) *Attorney, Agent, or Firm* — Jefferson IP Law, LLP

(57) ABSTRACT

An electronic device is provided. The electronic device includes a light source, a fingerprint sensor, a memory configured to record an image of a reflected light detected when the light source is turned on, and a processor configured to operatively coupled to the light source, the fingerprint sensor, and the memory, wherein the light source may form an irradiation area on a display surface by light irradiation to a display, the irradiation area may include a fingerprint recognition area formed on the display, at least one surface may match the fingerprint recognition area or at least one vertex coincides, and the matched area may form a first area. The memory may store instructions allowing the processor to irradiate light in a designated direction using the light source, obtain a first image and analyze the first image to distinguish whether the object detected by the fingerprint sensor is flat or three-dimensional.

20 Claims, 16 Drawing Sheets

(51) Int. Cl.
*G06V 40/12* (2022.01)
*G06V 40/13* (2022.01)

(56) References Cited

U.S. PATENT DOCUMENTS

| | | |
|---|---|---|
| 10,929,632 B2 | 2/2021 | Shin et al. |
| 11,455,826 B2 | 9/2022 | Zhong et al. |
| 11,574,505 B2 | 2/2023 | Lee et al. |
| 2018/0082102 A1* | 3/2018 | Lee ................ G06F 21/32 |
| 2019/0026527 A1 | 1/2019 | He et al. |
| 2019/0228204 A1 | 7/2019 | Park et al. |
| 2019/0354226 A1 | 11/2019 | Choi et al. |
| 2023/0137785 A1 | 5/2023 | Hammersberg et al. |

FOREIGN PATENT DOCUMENTS

| | | |
|---|---|---|
| KR | 10-2016-0128872 A | 11/2016 |
| KR | 10-2018-0031511 A | 3/2018 |
| KR | 10-2018-0089093 A | 8/2018 |
| KR | 10-2018-0097997 A | 9/2018 |
| KR | 10-2021-0040897 A | 4/2021 |
| KR | 10-2021-0157952 A | 12/2021 |
| KR | 10-2022-0154539 A | 11/2022 |
| WO | 2021/077259 A1 | 4/2021 |
| WO | 2021/211030 A1 | 10/2021 |

* cited by examiner

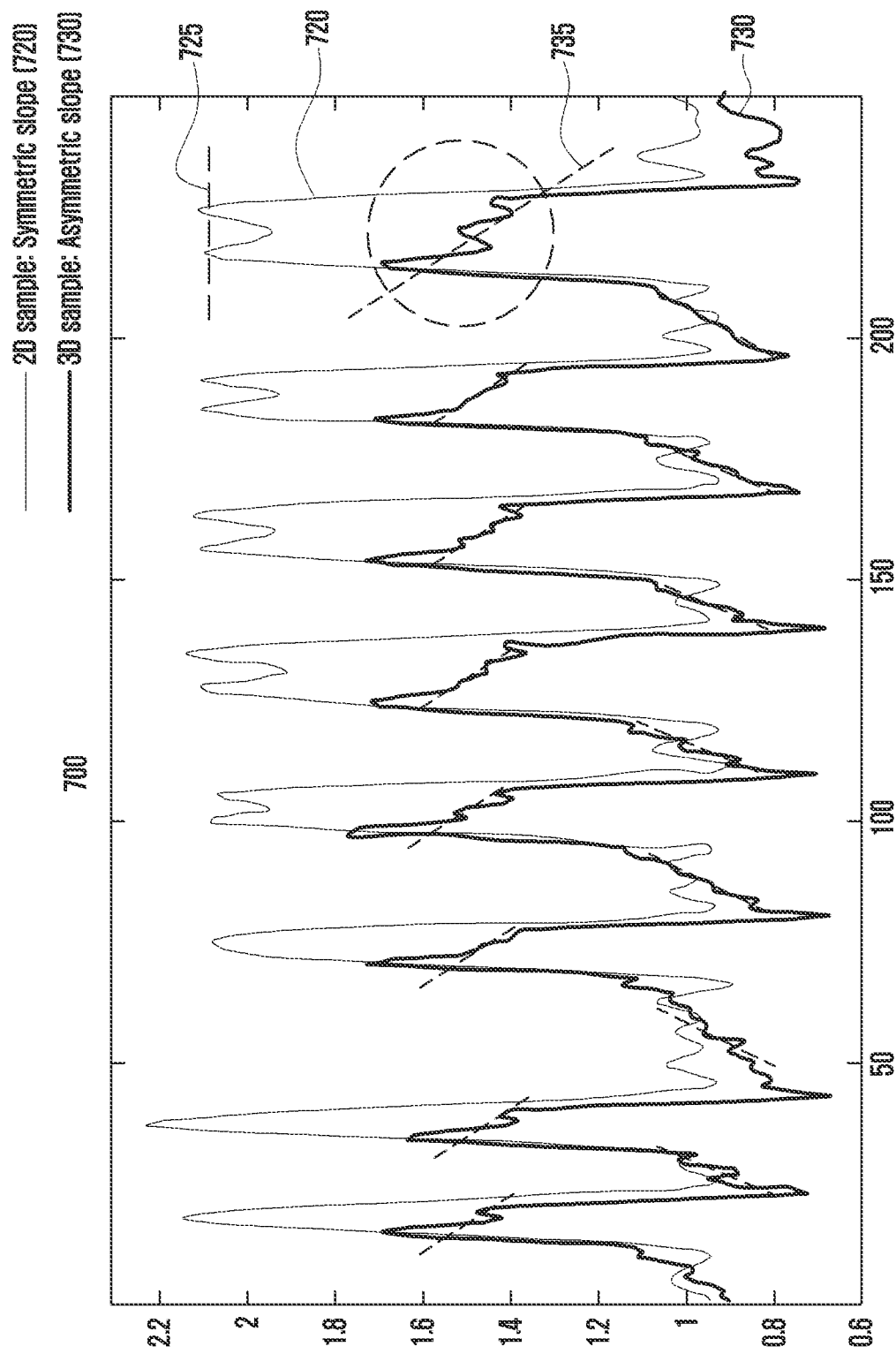

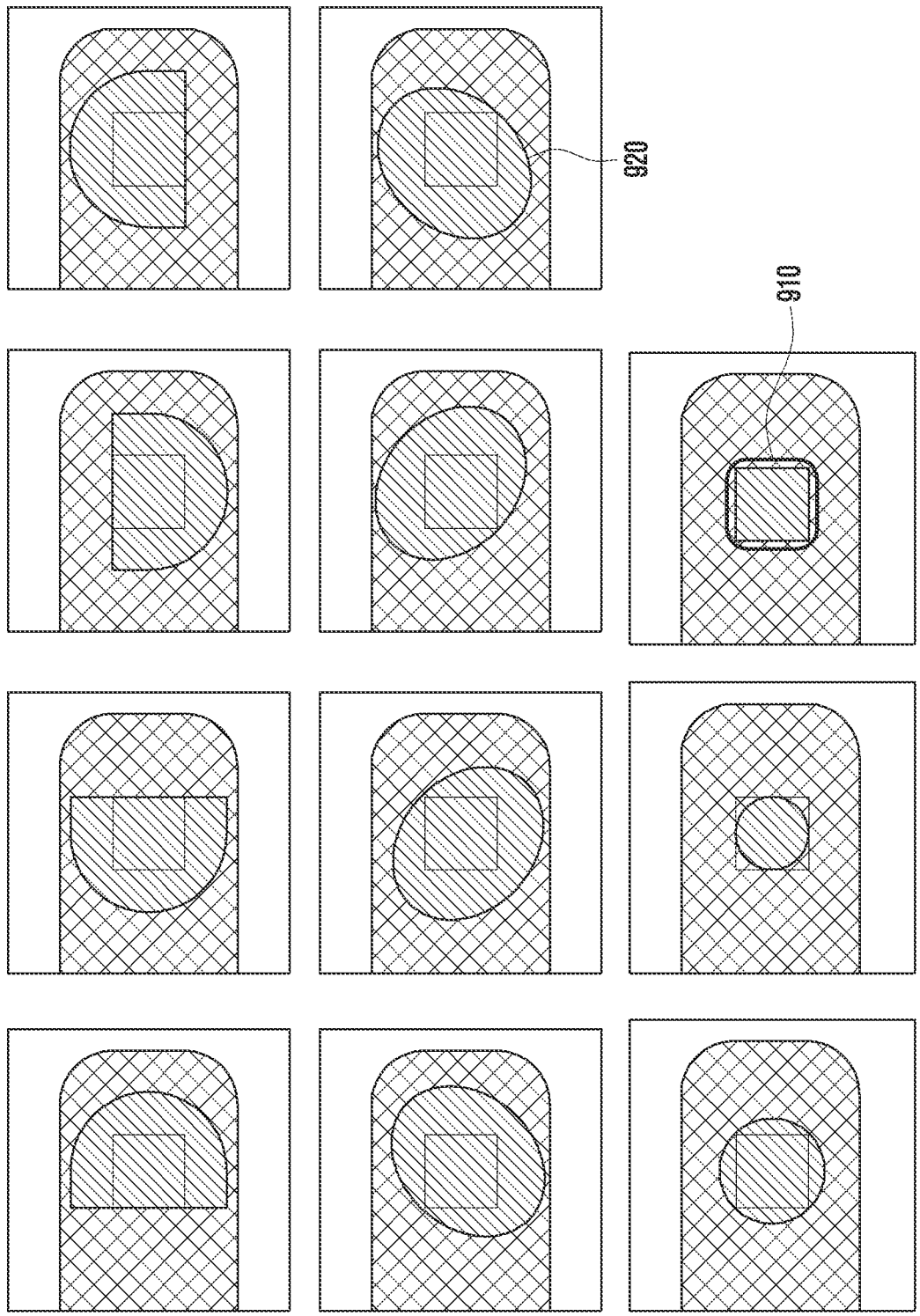

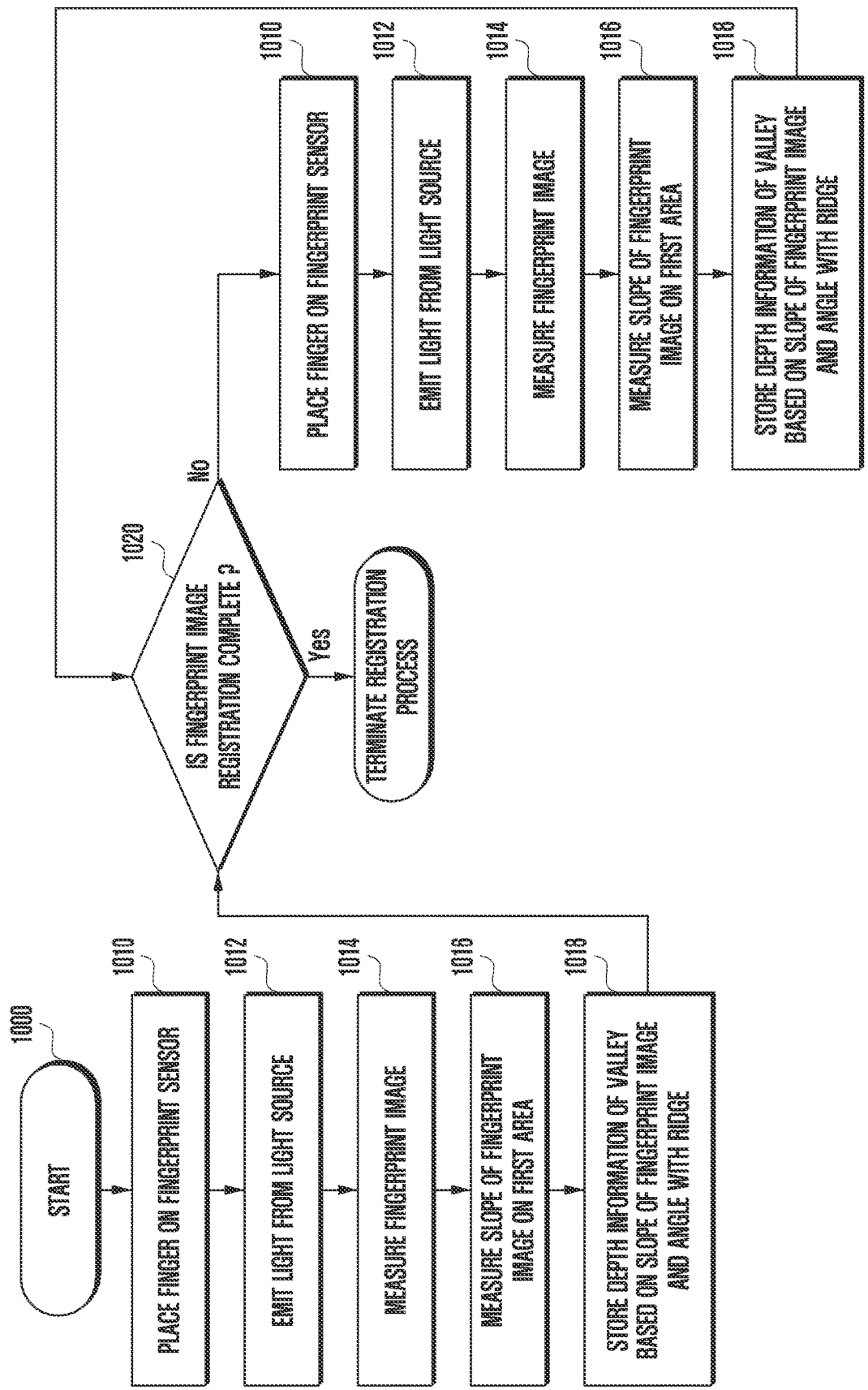

US 11,803,624 B2

ELECTRONIC DEVICE AND METHOD FOR ACQUIRING FINGERPRINT INFORMATION THEREOF

CROSS-REFERENCE TO RELATED APPLICATION(S)

This application is a continuation application, claiming priority under § 365(c), of an International application No. PCT/KR2022/007502, filed on May 26, 2022, which is based on and claims the benefit of a Korean patent application number 10-2021-0097280, filed on Jul. 23, 2021, in the Korean Intellectual Property Office, the disclosure of which is incorporated by reference herein in its entirety.

TECHNICAL FIELD

The disclosure relates to a method for acquiring a fingerprint. More particularly, the disclosure relates to a method and an apparatus for acquiring a fingerprint by using a touch input.

BACKGROUND ART

In line with development of mobile communication technologies and processor technologies, electronic devices (for example, portable terminal devices) may perform various functions in addition to conventional call functions. For example, various applications such as Internet browsers, games, or calculators have been developed and utilized on electronic devices. As various functions have become available by electronic devices, security of information stored in electronic devices have become important, and technologies for authentication based on the user's biometric information have been developed for such security-related reasons.

Authentication technologies based on biometric information may include, for example, operations of acquiring various pieces of biometric information such as the fingerprint, iris, voice, face, or blood vessel from the user, comparing the same with pre-registered biometric information of the user, and confirming an authenticated user. Technology for recognizing fingerprints among the pieces of biometric information is currently the most commercialized for various reasons such as convenience, security, or economic merits. An electronic device may store fingerprint information extracted from a fingerprint image to be used for fingerprint authentication from the user for user authentication using fingerprint recognition in the memory. The electronic device may detect the user's unique fingerprint information according to a ridge and a valley of a finger formed on the finger through a fingerprint sensor module, and may determine whether to authenticate the same or not through a comparison with the prestored fingerprint. That is, if a fingerprint image newly input from a user who request authentication matches with the pre-registered fingerprint image as a result of comparison, the electronic device may authenticate the corresponding user as a registered user.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An optical fingerprint sensor is configured to use only the difference in the amount of light reaching each pixel of the fingerprint sensor (2 dimensional (2D) array sensor), thereby making it difficult to verify the cause of the difference in the amount of light reaching the sensor. In other words, it may be difficult to distinguish whether the difference in the amount of light reaching the sensor is caused by a difference in the degree of reflection due to a difference in the contact between the display surface and the fingerprint, such as the ridge/valley of the fingerprint of an actual finger, or the difference in the amount of light reaching the sensor is caused by a 2D image having a different degree of reflection, which is obtained by printing a fingerprint image onto 2D paper. In the case of an actual optical InDisplay fingerprint sensor, when a 2D printing and an actual finger are recognized, the same fingerprint image may be acquired, thereby posing a risk of counterfeiting if the fingerprint image is used for personal identification.

Aspects of the disclosure are to address at least the above-mentioned problems and/or disadvantages and to provide at least the advantages described below. Accordingly, an aspect of the disclosure is to provide an electronic device and a method for acquiring fingerprint information by an electronic device to acquire not only a fingerprint surface image, but also information for confirming whether an authenticated sample type is a 3D type substantially simultaneously, thereby solving such a problem of fingerprint counterfeiting.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a light source, a fingerprint sensor, a memory configured to record an image of a reflected light detected when the light source is turned on, and a processor operatively coupled to the light source, the fingerprint sensor, and the memory, wherein the light source forms an irradiation area on a display surface by light irradiation to a display, the irradiation area includes a fingerprint recognition area formed on the display, and at least one surface matches the fingerprint recognition area or at least one vertex coincides, and the matched area forms a first area. The memory may store instructions for allowing the processor to irradiate light in a designated direction to the fingerprint recognition area using the light source, obtain a first image generated in the irradiation direction of the light source on the first area and a second image generated in the remaining fingerprint recognition area, analyze the first image to distinguish whether the object detected by the fingerprint sensor is flat or three-dimensional, and compare user data stored in the memory in advance with the second image or compare the user data stored in the memory in advance with a fingerprint image including the first image and the second image to detect whether the object detected by the fingerprint sensor matches a fingerprint of a designated user, when the object detected by the fingerprint sensor is three-dimensional.

In accordance with another aspect of the disclosure, a fingerprint recognition method of an electronic device is provided. The fingerprint recognition method includes irradiating light in a designated direction to a fingerprint recognition area using a light source, obtaining a first image generated in the irradiation direction of the light source on a first area and a second image generated in the remaining fingerprint recognition area, analyzing the first image to distinguish whether an object detected by a fingerprint sensor is flat or three-dimensional, and comparing user data stored in a memory in advance with the second image or comparing the user data stored in the memory in advance with a fingerprint image including the first image and the second image to detect whether the object detected by the fingerprint sensor matches a fingerprint of a designated user, when the object detected by the fingerprint sensor is three-dimensional.

Advantageous Effects of Invention

An electronic device and a fingerprint recognition method according to various embodiments of the disclosure may confirm whether an authenticated sample type is a 3D type without additional hardware, thereby facilitating fingerprint recognition with improved security.

Various embodiments may provide fingerprint recognition with improved security for an identical recognition time without increasing the fingerprint recognition time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 7 is a graph illustrating a difference in shading of the first area according to a sample shape according to an embodiment of the disclosure;

FIG. 9 illustrates a shape of a light source according to an embodiment of the disclosure;

FIG. 10 is a flowchart illustrating a registration operation of a method of obtaining fingerprint information of an electronic device according to an embodiment of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
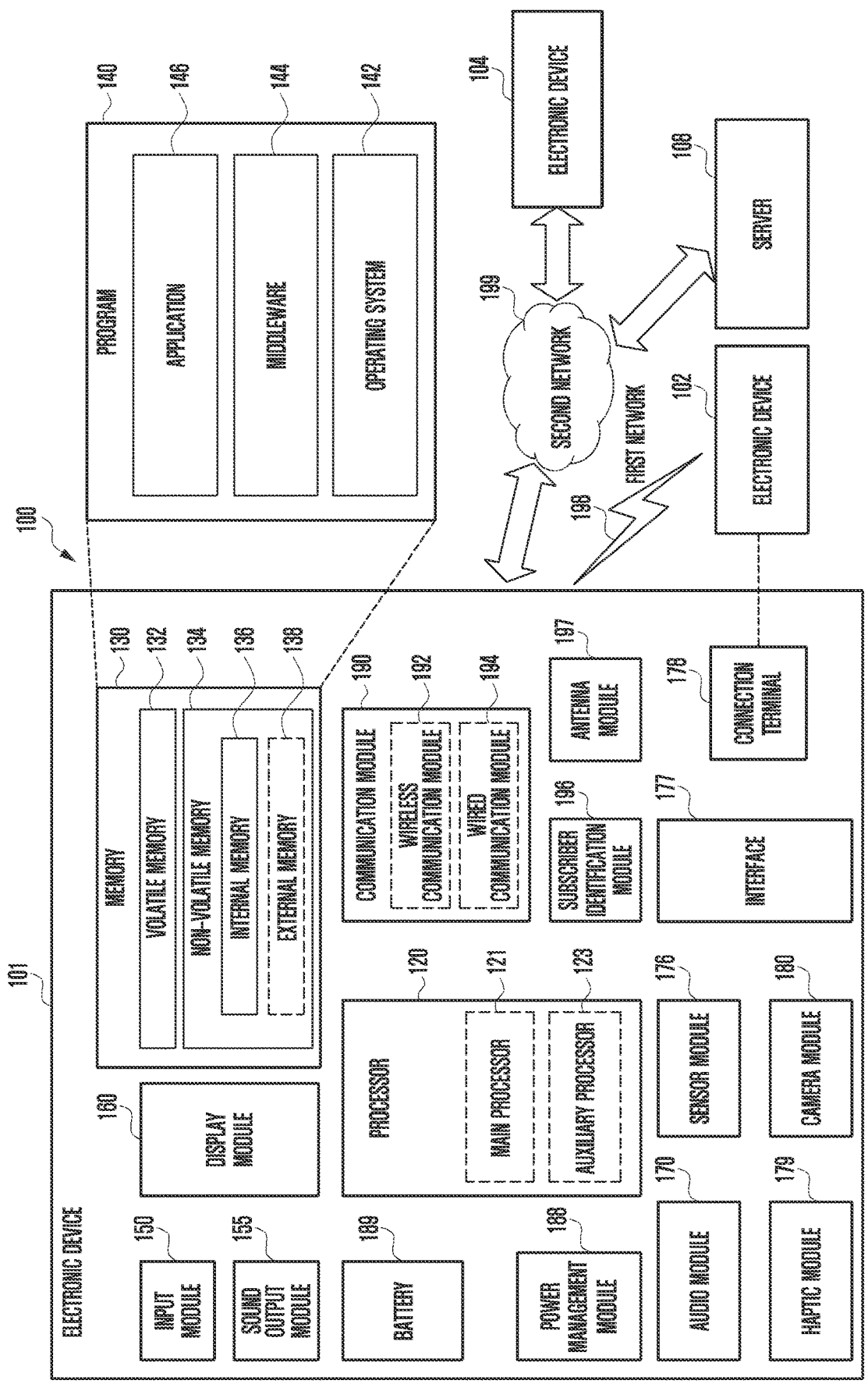
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
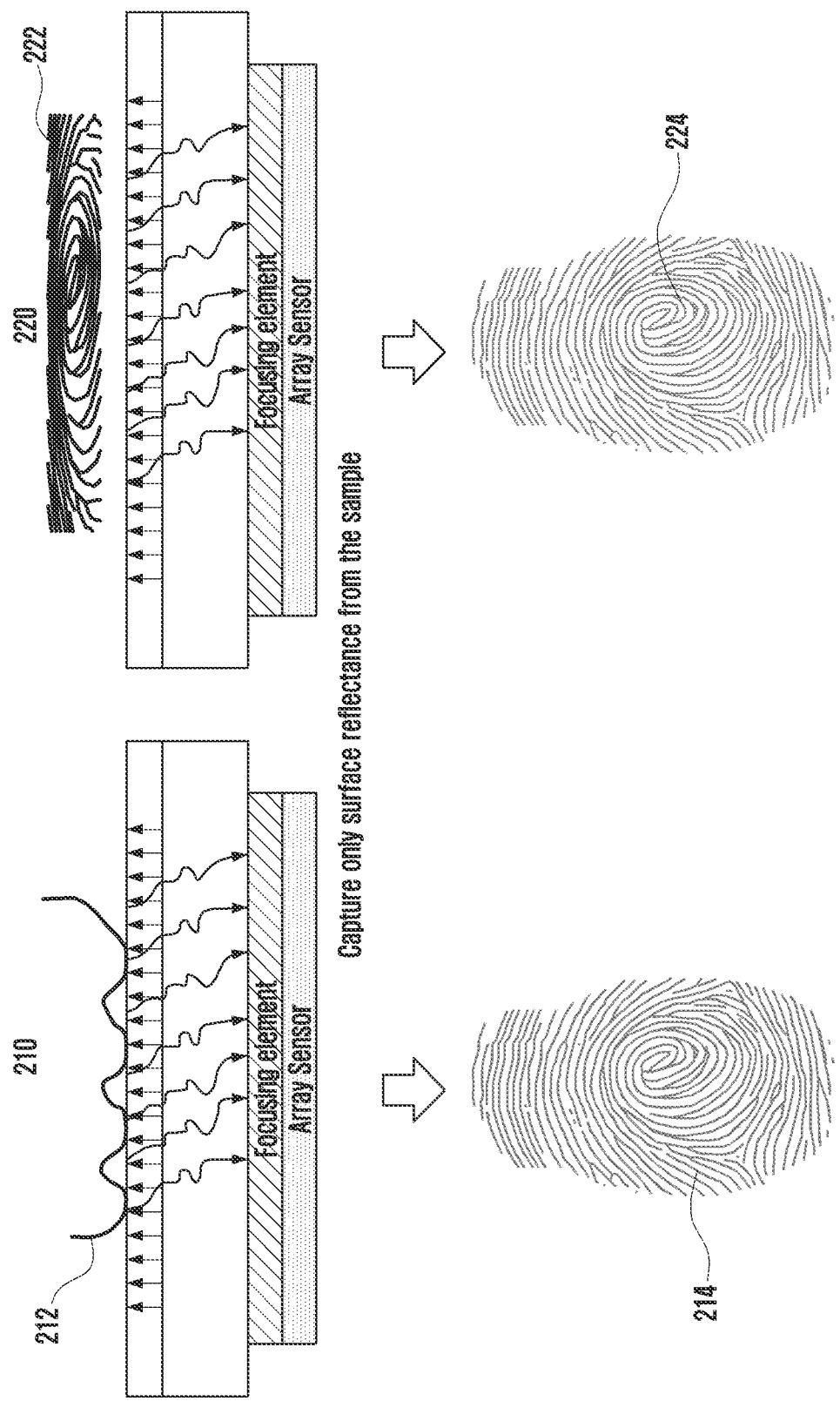
FIG. 2 illustrates a fingerprint recognition operation according to an embodiment of the disclosure.

FIG. 2 illustrates a fingerprint recognition operation according to an embodiment of the disclosure.

Referring to FIG. 2, according to a FIG. 210, when a user's finger 212 contacts a display (e.g., a display module 160 of FIG. 1) including a fingerprint sensor, a processor (e.g., a processor 120 of FIG. 1) may measure reflected light by light irradiation using a light source. The processor 120 may obtain a fingerprint image based on the measured reflected light. Specifically, the processor 120 may determine the difference in the degree of reflection of light generated from ridges and valleys of the fingerprint by using focusing elements such as a lens or a collimator. The processor 120 may detect and distinguish a difference in light collected at each pixel of the image sensor, and convert the difference into the shape of ridges and valleys to obtain a basic image 214 of the fingerprint. When the processor 120 forms the basic image 214 of the fingerprint, the difference in the degree of reflection according to the characteristics of the ridges and valleys may act as an important component that makes the difference between the generated fingerprint images.

However, the operation of the optical fingerprint sensor may detect only the difference in light collected at each pixel of the 2D array sensor. Therefore, the processor 120 only detects the difference in the amount of light reaching the sensor, and it may be difficult to detect the reason of the difference in the amount of light. As illustrated in the FIG. 220, the processor 120 may obtain the same fingerprint image 224 as the user's finger 212 even if an image of a fingerprint other than the user's finger 212 is printed on the two-dimensional paper 222 and authenticated by the fingerprint sensor. In this case, when the fingerprint image is used for personal identification purposes, a risk of theft may occur.

Figure 3:
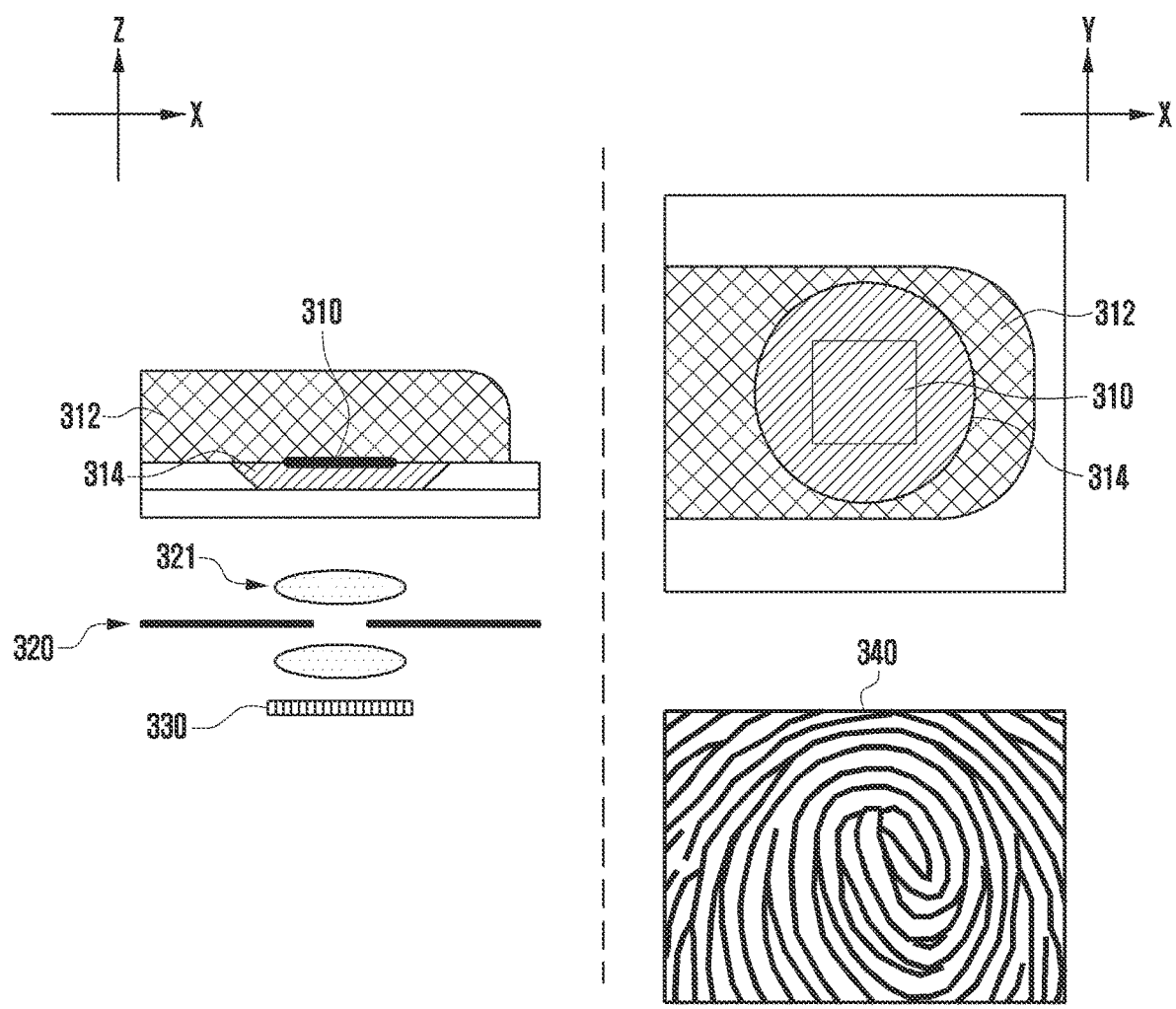
FIG. 3 is a cross-sectional view illustrating a configuration of an optical fingerprint sensor according to an embodiment of the disclosure.

FIG. 3 is a cross-sectional view illustrating a configuration of an optical fingerprint sensor according to an embodiment of the disclosure.

Referring to FIG. 3, an active area 310 may refer to an area activated for authentication when a user's finger 312 is positioned on the display module 160. The processor 120 may irradiate light to the user's finger 312 using the light source 314 and collect the reflected light. The processor 120 may generate a fingerprint image 340 by analyzing the reflected light collected by an image sensor 330 through a lens 321 and a light transmission hole 323. The processor 120 may release the security of the electronic device 101 when the fingerprint image 340 is matched with the user's fingerprint previously stored in the memory (e.g., a memory 130 of FIG. 1). However, as mentioned above in FIG. 2, the processor 120 may have difficulty distinguishing the user's finger 312 from the fingerprint image output on the two-dimensional paper 222. In this case, when the fingerprint image is used for personal identification purposes, a risk of theft may occur. Hereinafter, in order to prevent such a risk of theft, the electronic device 101 for simultaneously identifying whether the shape of a sample is a 3D shape and a method for obtaining fingerprint information thereof will be described.

Figure 4A:
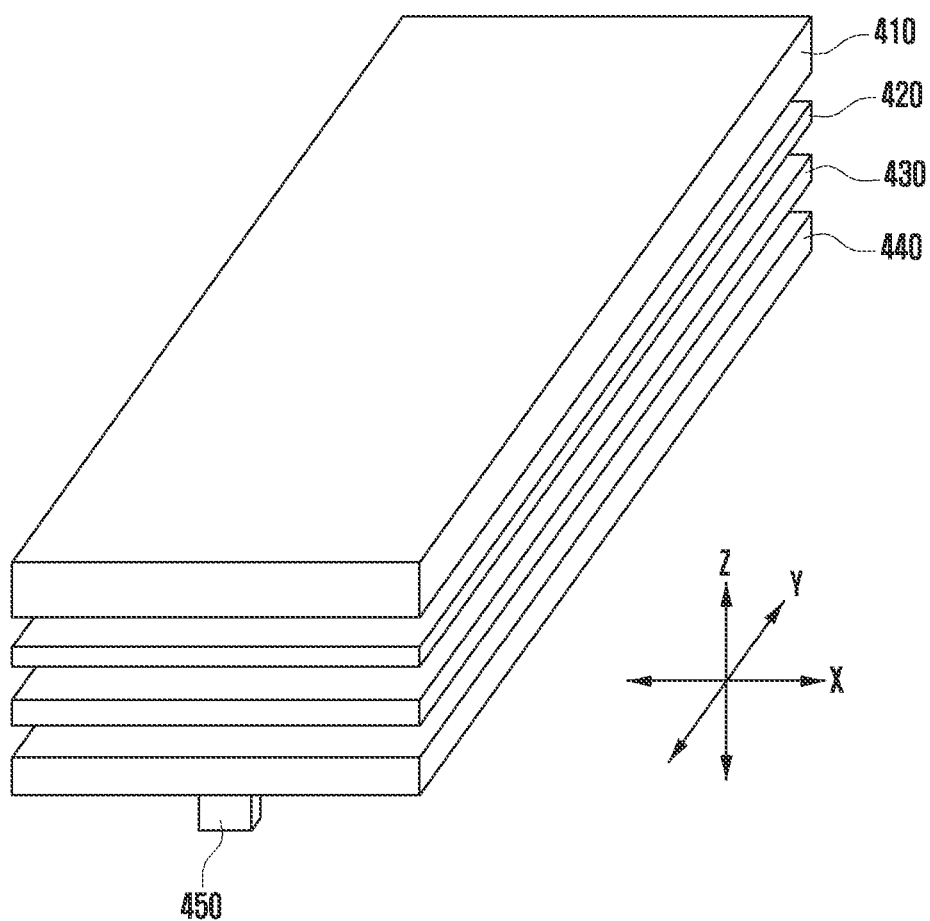
FIGS. 4A and 4B schematically illustrate an electronic device having a fingerprint sensor according to various embodiments of the disclosure.
Figure 4B:
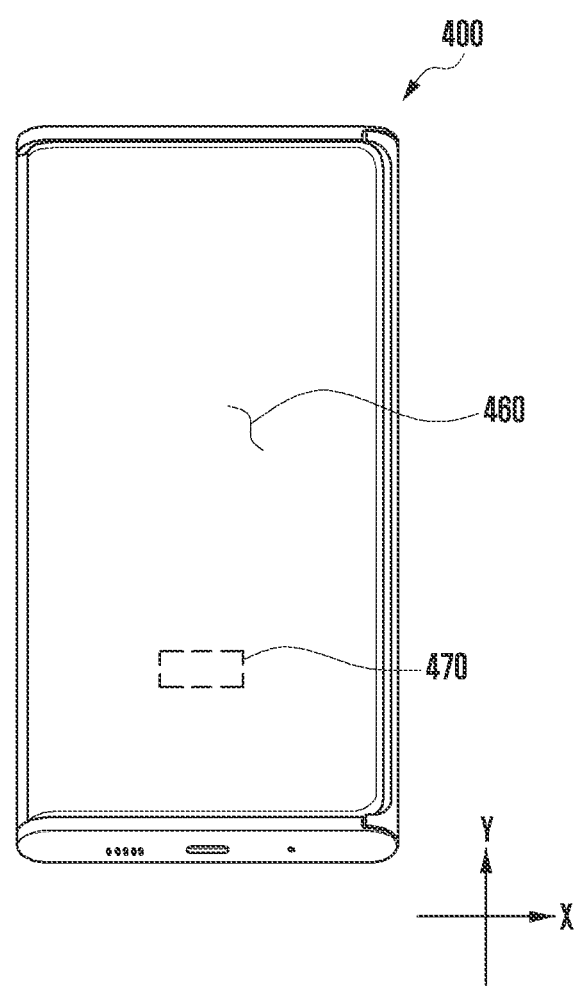

FIGS. 4A and 4B schematically illustrate an electronic device having a fingerprint sensor according to various embodiments of the disclosure.

FIG. 4A illustrates a hierarchical structure of an electronic device (e.g., an electronic device 101 of FIG. 1) including a fingerprint sensor.

Referring to FIG. 4A, the +z-axis direction may be a front direction of the electronic device 101, and the −z-axis direction may be a rear direction of the electronic device 101, and each component may be included in the housing. A cover window 410 may be formed on the front surface of the housing. The cover window 410 may be formed of a transparent material to allow light to pass therethrough, and may be formed to protect a display 440 and a touch sensor 430 from external impact. The touch sensor 430 and the display 440 may be formed at the lower end of the cover window 410. The cover window 410 may be attached to the upper end of the touch sensor 430 and the display 440 using an optically clear adhesive (OCA) 420. In FIG. 4A, the touch sensor 430 is illustrated as being provided on the upper end of the display 440, but not limited thereto, and may be implemented in various ways including an on-cell method or an in-cell method. The touch sensor 430 may detect a touch of an object (e.g., a user's finger or stylus pen) on the cover window 410, and a method in which the touch sensor 430 detects a touch may not be limited thereto. A fingerprint sensor 450 may be provided at a lower end of the display 440 (or touch sensor 430). When the user's finger is positioned on the upper end of the cover window 410, the fingerprint sensor 450 may be formed to obtain fingerprint information of the user's fingerprint information.

According to an embodiment, the fingerprint sensor 450 may be formed in one area of the rear surfaces of the display 440 and the touch sensor 430. When the user touches (or hovers) a finger on the touch sensor 430 on the display 440, the processor (e.g., the processor 120 of FIG. 1) may recognize the user's fingerprint.

According to an embodiment, the arrangement method of the fingerprint sensor 450 may include, for example, an under-display method in which a sensing unit or an electrode is disposed under a display panel.

According to an embodiment, the fingerprint sensor 450 may use an optical method of obtaining a fingerprint by capturing a fingerprint image of a finger surface using a photosensitive diode.

Hereinafter, a case where the optical fingerprint sensor is disposed under the display 440 and the touch sensor 430 (under-display method) will be described as a representative, but various other arrangement methods may be applied.

FIG. 4B illustrates an example of a fingerprint sensor located on a display panel of an electronic device according to various embodiments of the disclosure.

Referring to FIG. 4B, a fingerprint sensor 470 may be formed on the rear surface of the display 460 and may not be visually recognized by the user. According to an embodiment, when the display 460 is viewed from the front, an area overlapping the fingerprint sensor 470 disposed on the rear surface of the display 460 may be referred to as a fingerprint sensing area. In this case, at least one area (e.g., the fingerprint sensing area) of the cover window (e.g., the cover window 410 of FIG. 4A), OCA (e.g., the OCA 420 of FIG. 4A), the touch sensor (e.g., the touch sensor 430 of FIG. 4A), and the display 460 (e.g., the display 440 of FIG. 4A) may include a transparent or translucent area so that light of a predetermined value or more may pass therethrough.

According to an embodiment, the transparent or translucent area may be formed by controlling an on/off operation of at least one pixel included in at least one area of the display 460. In addition, the fingerprint sensor 470 may be disposed on the rear surface of the corresponding transparent or translucent area to obtain a fingerprint image of the user. According to an embodiment, the electronic device 400 may form a hole between the pixel and the pixel so that at least a predetermined amount of light may pass through at least one area of the display 460. Although FIG. 4B illustrates that one fingerprint sensor 470 is formed at the center of the display 460 to form a fingerprint sensing area, the number, position, and/or size of the fingerprint sensor 470 is not limited thereto.

Referring to FIG. 4B, an electronic device 400 according to an embodiment of the disclosure discloses an example of a bar type electronic device, but the type of the electronic device 400 is not limited thereto, and may be applied to, for example, a slidable type, a rollable type, and/or a foldable type. The electronic device according to various embodiments disclosed in the disclosure may include, for example, a wearable device or a home appliance. The electronic device according to an embodiment of the disclosure is not limited to the above-described devices.

Figure 5:
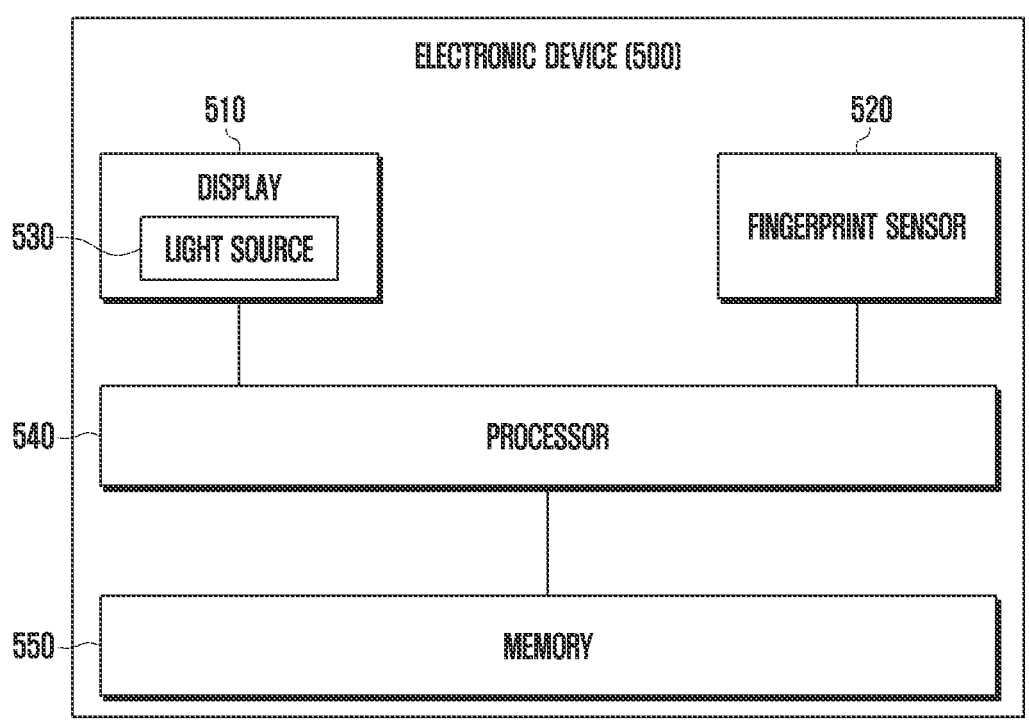
FIG. 5 is a block diagram illustrating a configuration of an electronic device according to an embodiment of the disclosure.

FIG. 5 is a block diagram illustrating a configuration of an electronic device according to an embodiment of the disclosure.

Referring to FIG. 5, an electronic device 500 includes a display 510, fingerprint sensor 520, a light source 530, a processor 540, and/or a memory 550, and even if some of the illustrated components are omitted or substituted, there will be no hindrance to implementing various embodiments of the disclosure. In addition, the electronic device 500 may include at least some of the configuration and/or functions of the electronic device 101 of FIG. 1.

According to various embodiments, the display 510 displays an image, and may be implemented as any one of a liquid crystal display (LCD) display, a light-emitting diode (LED) display, an organic light-emitting diode (OLED) display, a micro electro mechanical systems (MEMS) display, or an electronic paper display, but is not limited thereto. The display 510 may include at least some of the configuration and/or functions of the display module 160 of FIG. 1.

According to various embodiments, the fingerprint sensor 520 may obtain user's fingerprint information. The fingerprint sensor 520 may be implemented as an optical fingerprint sensor capable of obtaining a fingerprint image, but is not limited thereto. The fingerprint information obtained from the fingerprint sensor 520 is stored as image information, and may be used for authentication of the electronic device 500 through comparison with pre-registered fingerprint information. The fingerprint sensor 520 may be formed in at least one area of the rear surface of the display 510 or inside the display 510. Accordingly, when a touch input using a user's finger occurs on the cover window of the display 510, touch information may be obtained from a touch sensor (not illustrated), and simultaneously, fingerprint information may be obtained from at least some fingerprint sensors 520.

According to an embodiment, the fingerprint sensor 520 may obtain fingerprint information using light emitted from the display 510. The display 510 may function as a light source for the operation of the fingerprint sensor 520.

According to an embodiment, the fingerprint sensor 520 may include a CMOS image sensor (CIS), a charge coupled device image sensor (CCD), a TFT amorphous silicon image sensor, or an organic photodiode (OPD).

According to an embodiment, the fingerprint sensor 520 may include at least one lens. The lens disposed on the fingerprint sensor 520 may include a lens type having a lens magnification of substantially less than 1× (e.g., ¼ to ⅐), and a lensless type in which a lens does not exist, or a micro-lens, a pin-hole array, or an optical fiber is used so that the magnification of the lens is substantially close to 1×.

According to an embodiment, the fingerprint sensor 520 may be activated when the fingerprint recognition function is activated, for example, when an application with security such as unlock operation, or message application is executed, and according to another embodiment, the fingerprint sensor 520 may be activated when the fingerprint recognition function is activated and a touch input occurs on the area of the fingerprint sensor 520.

According to an embodiment, the electronic device 500 according to the disclosure uses an optical fingerprint sensor, and basically the display 510 may be used as a type of a light source 530. Hereinafter, as the electronic device 500 using the optical fingerprint sensor, the light emitted from the display 510 will be described as one type of light source 530, but the light source 530 may be separately disposed in the electronic device 500.

According to various embodiments, the processor 540 is a component capable of performing an operation or data processing related to control and/or communication of each component of the electronic device 500, and may include at least a part of the configuration of the processor 120 of FIG. 1. The processor 540 may be electrically connected to internal components of the electronic device 500 including the display 510, the fingerprint sensor 520, the light source 530, and/or the memory 550.

In an embodiment, the processor 540 may supply a driving signal for fingerprint sensing by using at least some of the plurality of pixels (PX) of the display 510. The driving signal may be provided so that at least some of the plurality of pixels of the display 510 emit light to operate as a light source for the fingerprint sensor 520.

The memory 550 is for temporarily or permanently storing non-limited digital data, and may include at least one of the configurations of the memory 130 of FIG. 1. The memory 550 may include a volatile memory and a non-volatile memory. The non-volatile memory may include at least one of one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), hard drive, or solid state drive (SSD) and the volatile memory may include at least one of dynamic RAM (DRAM), static RAM (SRAM), or synchronous dynamic RAM (SDRAM).

The memory 550 may store various instructions that may be executed by the processor 540. Such instructions may include control commands such as arithmetic and logical operations, data movement, and/or input/output that can be recognized by the processor 540, and may be defined on a framework stored in the memory 550.

According to an embodiment, the memory 550 may include a register (not illustrated). The register may record an image of the detected reflected light when a designated light source (e.g., at least some of a plurality of pixels) is turned on. The processor 540 may control the operation of the designated light source to be synchronized with the operation of the fingerprint sensor 520, receive a stored value from a register, and reconfigure the fingerprint image through an image processing process.

According to an embodiment, the memory 550 may store user data related to a fingerprint of a registered user through a fingerprint registration operation. For example, user data may be stored in a secure area of the memory 550.

According to various embodiments, there will be no limitations on the operation and data processing functions that the processor 540 can implement in the electronic device 500, but hereinafter, an operation for solving the problem of fingerprint theft by simultaneously obtaining information identifying whether the form of the authenticated sample is a 3D form according to various embodiments of the disclosure will be described in more detail. Operations of the processor 540 to be described later may be performed by loading instructions stored in the memory 550 described above.

According to an embodiment, the memory 550 may store instructions for controlling the processor 540 to release security of the electronic device when the user data stored in advance in the memory 550 and the obtained second image or a fingerprint image including the first image and the second image are compared and the object detected by the fingerprint sensor 520 matches the fingerprint of a designated user.

According to an embodiment, the user data previously stored in the memory 550 may include at least one of a shape of the user's fingerprint, valley depth information of the user's fingerprint, a gap between the valley and the ridge of the user's fingerprint, an angle of the first area according to the depth of the valley, an angle of the first area by the length of the gap between the ridges, an angle between the valley and the ridge of the user's fingerprint and the irradiation direction of the light source 530, a shape of cross-section data according to the angle between valleys and ridges and the irradiation direction of the light source 530, and an irradiation angle and direction of the light source 530.

According to an embodiment, the memory 550 may store instructions for controlling the processor 540 to terminate the fingerprint recognition operation when the user data stored in advance in the memory 550 and the obtained second image or the fingerprint image including the first image and the second image have a similarity lower than a preset first level as a result of comparison, and may store instructions for controlling the processor 540 to release security of the electronic device when the user data stored in advance in the memory 550 and the obtained first image and the second image have a similarity level greater than or equal to a preset first level.

According to an embodiment, the first area may include at least one of one vertex on the fingerprint recognition area overlapping the light emitting area of the light source 530, the vertex of each of the four parts, or each of the four surfaces.

According to an embodiment, the processor 540 may determine that the object recognized by the fingerprint sensor 520 is three-dimensional when the first image includes shading, and may determine that the object recognized by the fingerprint sensor 520 is a plane when the first image does not include shading.

According to an embodiment, the memory 550 may store instructions for controlling to terminate the fingerprint recognition operation when the processor 540 determines that the object detected by the fingerprint sensor 520 is a plane as a result of analyzing the first image.

According to an embodiment, when it is determined that the object detected by the fingerprint sensor 520 is three-dimensional as a result of analyzing the first image by the processor 540, the memory 550 may store instructions for controlling the processor 540 to determine whether an object detected by the fingerprint sensor 520 matches the fingerprint of a designated user by comparing the user data previously stored in the memory 550 with the obtained second image or a fingerprint image including the first image and the second image.

According to an embodiment, when it is determined that the object detected by the fingerprint sensor 520 is a plane as a result of analyzing the first image by the processor 540, the memory 550 may store instructions for controlling the processor 540 to identify whether the irradiation direction of the light source 530 and the ridge of the user's fingerprint are parallel.

According to an embodiment, when the irradiation direction of the light source 530 and the ridge of the user's fingerprint are not parallel, the memory 550 may store instructions which determine the object recognized by the fingerprint sensor 520 as a plane, and configure the irradiation direction of the light source 530 to be a direction not parallel to the ridge of the user's fingerprint when the irradiation direction of the light source 530 is parallel to the ridge of the user's fingerprint.

Figure 6:
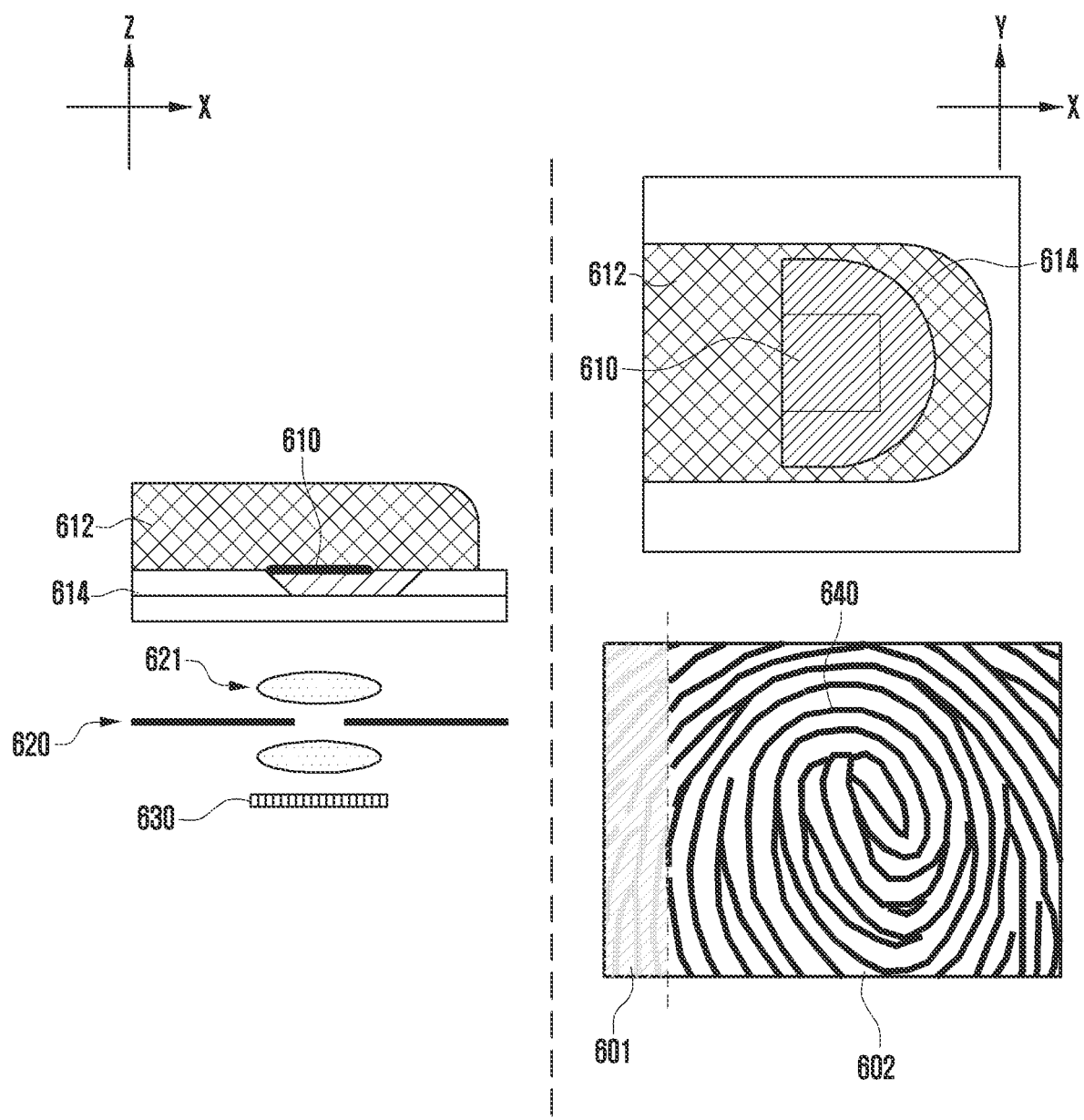
FIG. 6 is a cross-sectional view illustrating a configuration of an optical fingerprint sensor on an electronic device according to an embodiment of the disclosure.

FIG. 6 is a cross-sectional view illustrating a configuration of an optical fingerprint sensor on an electronic device according to an embodiment of the disclosure.

FIG. 6 illustrates a cross-section of the fingerprint sensor (e.g., the fingerprint sensor 470 of FIG. 4B) when the display (e.g., a display 460 of FIG. 4B) is viewed from the lower bezel (y-axis direction) with reference to the electronic device 400 of FIG. 4B.

An active area 610 may refer to an area (or fingerprint sensing area, fingerprint recognition area) activated for authentication when a user's finger 612 is positioned on the light source 614. The processor (e.g., the processor 540 of FIG. 5) may irradiate light to the user's finger 612 using the light source 614 and collect the reflected light. Because the light emitted from the light source 614 spreads and travels, the size of the irradiated area may be relatively larger in the plane on which the fingerprint is actually placed compared to the plane in which the light source 614 emits light. Referring to FIG. 6, it may be seen that the area irradiated on the plane on which the actual fingerprint corresponding to the upper end of the light source 614 is placed is wider than the lower end of the light source 614. The processor 540 may generate a fingerprint image 640 by analyzing the reflected light collected by the image sensor 630 through the lens 621 and the light transmission hole 620. When the fingerprint image 640 is matched with the user's fingerprint pre-stored in the memory (e.g., the memory 550 of FIG. 5), the processor 540 may release the security of the electronic device (e.g., the electronic device 500 of FIG. 5).

Unlike the comparative embodiment, in the electronic device 500 according to various embodiments of the disclosure, one surface of the active area 610 may coincide with one surface of the area irradiated by the light source. According to the comparative embodiment, the light source may be designed for the purpose of light irradiation to an active area or a larger area sufficiently including the fingerprint recognition area, and light irradiation evenly on the fingerprint recognition area. According to the embodiment of disclosure, one surface of the active area 610 may coincide with one surface of the area irradiated by the light source. In the matched area, the light source 530 may irradiate in a designated direction. In this case, an image including shading generated in the irradiation direction of the light source 530 may be obtained in the matched area.

The first area 601 may refer to an area in which an image in which shading occurs is obtained. For example, when the light source 530 is irradiated in the −X-axis direction, the first area 601 may obtain an image in which shading exists in the −X-axis direction. In the second area 602 on the remaining display 510, an image having no shading, like the fingerprint image (e.g., fingerprint image 340 of FIG. 3) of the comparative embodiment, may be obtained because the light source irradiation form is the same as that of the comparative embodiment.

In the fingerprint image 640, shading may occur when the sample (e.g., the user's finger 612) used for obtaining image has a three-dimensional shape and the three-dimensional thickness change is not aligned with the irradiation direction of the light source. The processor 540 may identify whether shading occurs using the image obtained from the first area 601. That is, the processor 540 may distinguish whether the sample obtaining the current image is a three-dimensional (or 3D) sample such as a real finger (e.g., the user's finger 212 of FIG. 2) or a two-dimensional (or plane) sample (e.g., 2D image 222 of FIG. 2) printed on paper according to whether the image obtained in the first area 601 is shaded. According to an embodiment, if the shape of the sample for which the current image is obtained is a two-dimensional shape, the processor 540 may determine that the image is stolen, and lock the screen of the electronic device 500, perform an intended security function, or terminate the authentication operation.

FIG. 7 is a graph illustrating a difference in shading of the first area according to a sample shape according to an embodiment of the disclosure.

Referring to FIG. 7, when a three-dimensional sample is used in the fingerprint recognition operation, and the irradiation direction of the light source and the ridges and/or valleys of the fingerprint are located perpendicular to each other, the fingerprint image formed by the three-dimensional sample may include shading.

Table 700 illustrates cross-section data of a fingerprint image obtained according to an irradiation direction of light in a first area (e.g., a first area 601 of FIG. 6). Table 700 may be represented as a graph including both the case where the shape of the sample is two-dimensional and three-dimensional.

According to Table 700, the graph 720 by the two-dimensional sample may include a symmetric shape because shading is not generated. In addition, the graph 730 by the 3D sample may include an asymmetrical shape according to shading. The graph 730 by the 3D sample may include an asymmetric slope. The processor (e.g., the processor 540 of FIG. 5) may determine whether the sample used for fingerprint recognition has a two-dimensional shape or a three-dimensional shape using the graph illustrated in Table 700.

According to an embodiment, the slope 735 of the graph 730 by the three-dimensional sample may be asymmetrical. The slope 735 by the three-dimensional sample may be determined by the depth of the three-dimensional sample, the irradiation angle of the light source, the irradiation direction of the light source, the angle between the ridges and valleys with the light source, and/or the width of ridges and valleys. When a two-dimensional sample is used, the processor 540 may detect only a difference in the amount of reflection according to the location of the sample on the first area 601. In this case, the slope 725 of the graph 720 by the two-dimensional sample may represent a symmetrical shape in both ridges and valleys. In addition, the slope 725 formed by the ridge and valley portions may be close to zero.

Figure 8A:
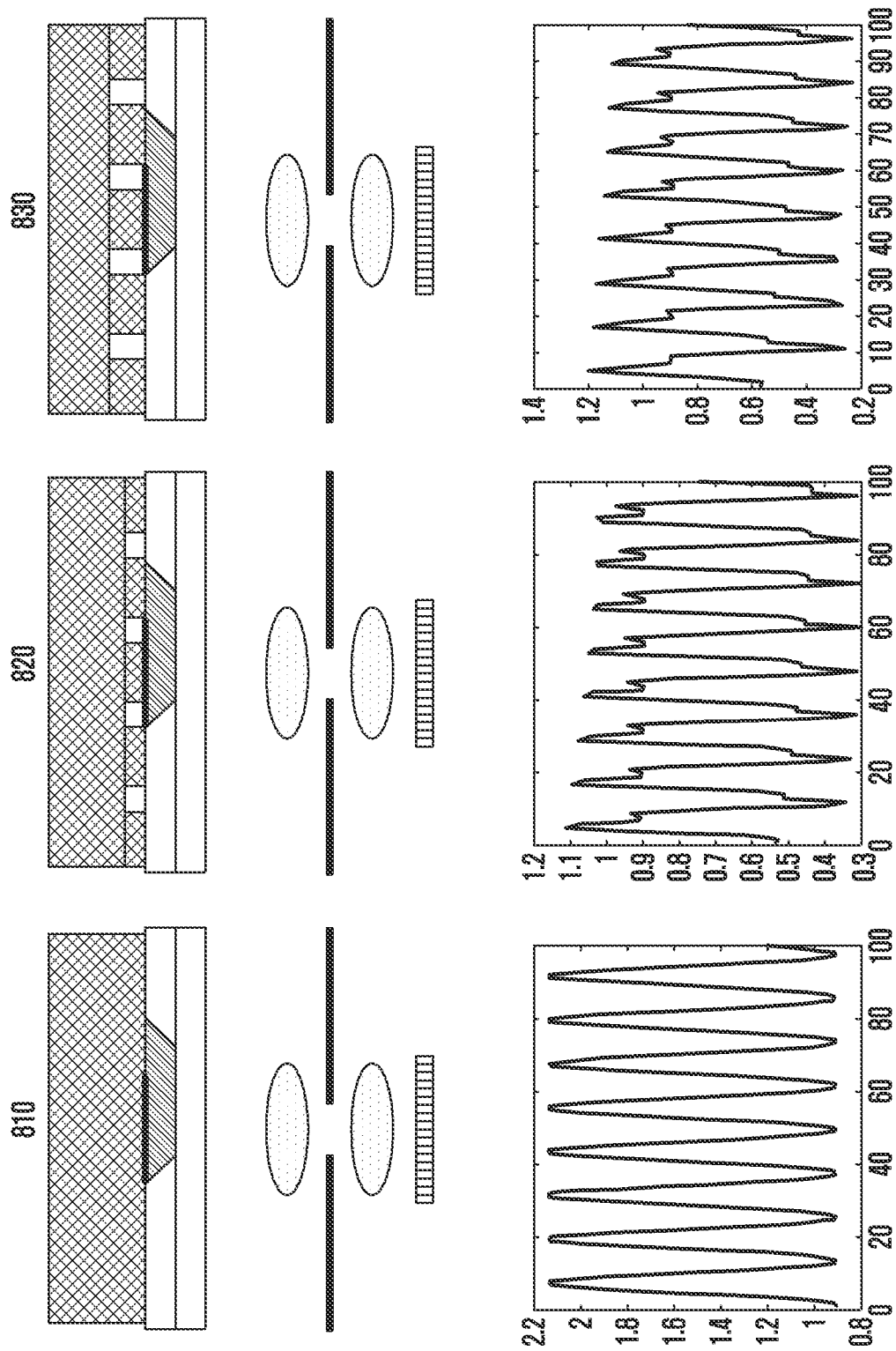
FIGS. 8A, 8B, and 8C are graphs illustrating cross section data of images according to various types of samples recognized by an image sensor according to various embodiments of the disclosure.
Figure 8B:
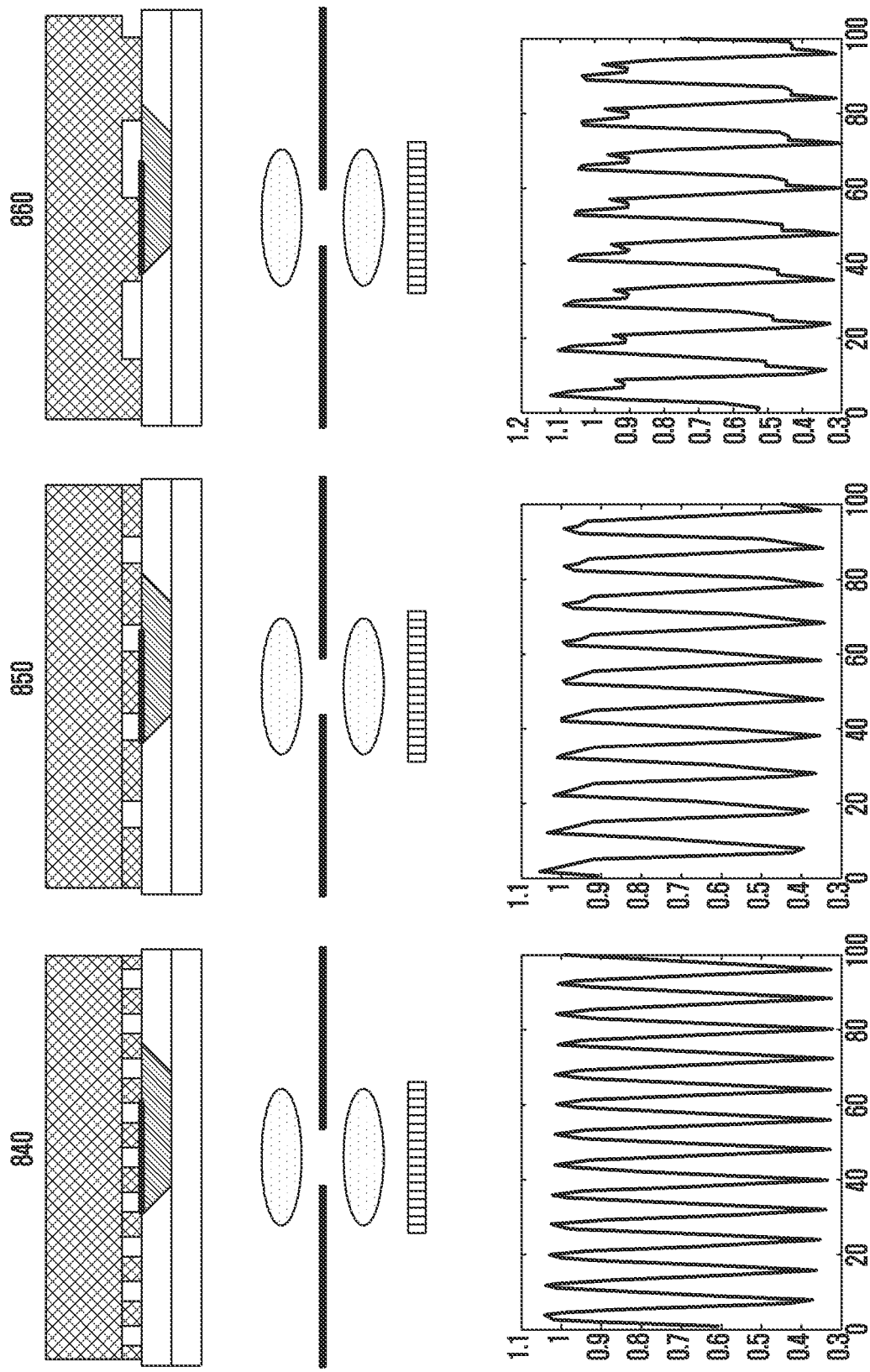
Figure 8C:
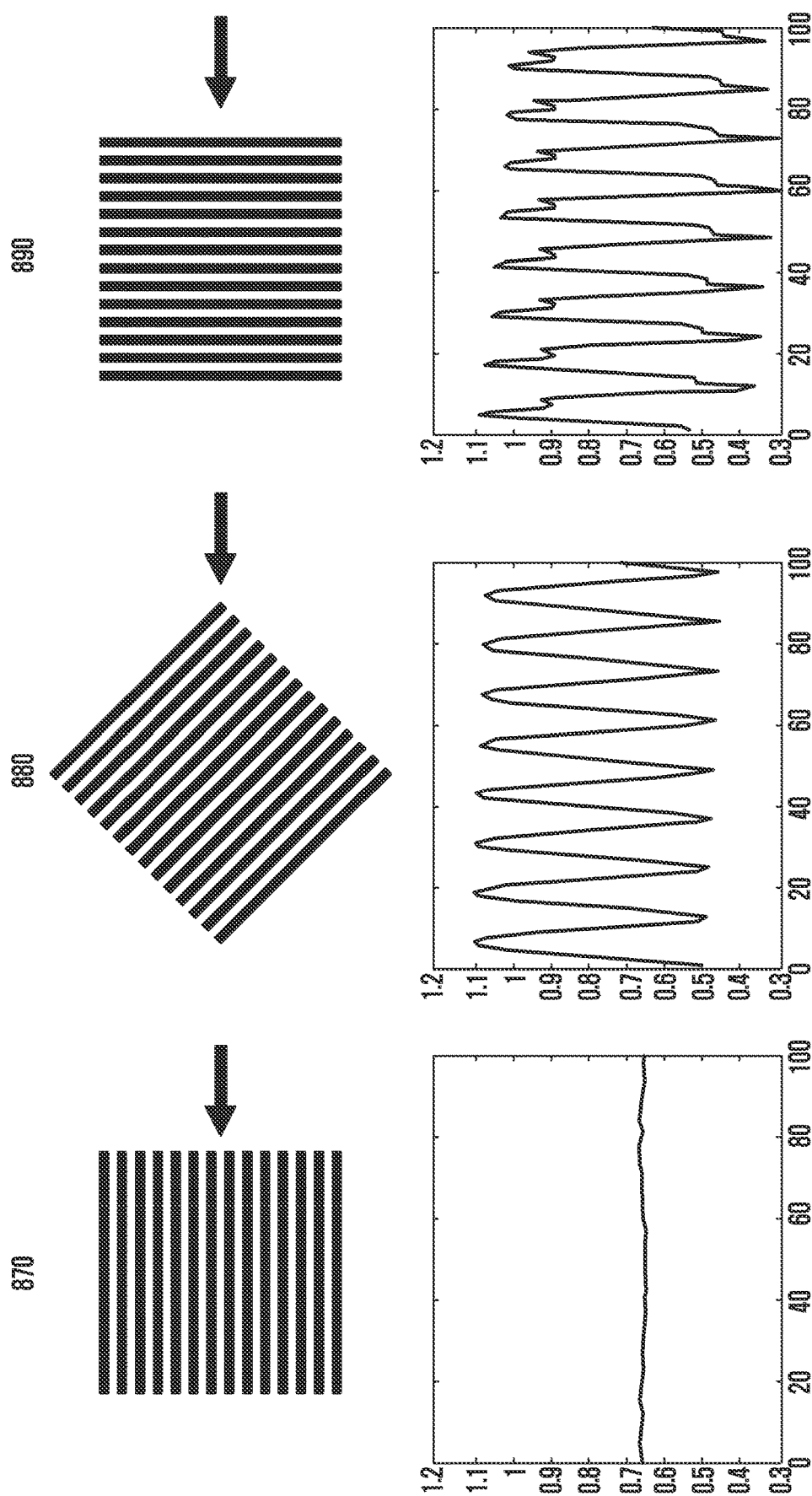

FIGS. 8A, 8B, and 8C are graphs illustrating cross section data of images according to various types of samples recognized by an image sensor according to various embodiments of the disclosure.

FIG. 8A illustrates samples in which ridges and valleys do not exist or ridges and valleys have different depths.

According to 810, the sample may include a two-dimensional type image that does not include ridges and valleys. In this case, the graph may be symmetric, and the slope may be close to zero.

According to 820, the sample may include a three-dimensional type image that include ridges and valleys. In this case, the graph may be asymmetric, and the slope may be formed on the graph.

According to 830, the sample may include a three-dimensional type image that include ridges and valleys. However, it may be seen that the difference in depth between the ridge and the valley is relatively larger than that of 820.

Comparing the cross section data of the image generated in this case, in the case of the two-dimensional image 810 that does not include ridges and valleys, it may be seen that the graph is symmetrical, while in the case of the three-dimensional images 820 and 830 that include ridges and valleys, it may be seen that the graphs are asymmetrical. In addition, the three-dimensional images 820 and 830 may form a slope. The processor (e.g., the processor 540 of FIG. 5) may distinguish whether the sample attempting authentication using symmetrical shapes of images 810 to 830 and/or whether a slope is formed is a two-dimensional form or a three-dimensional form.

FIG. 8B illustrates samples having different spacing between ridges and valleys.

According to 840 to 860, the sample may include a three-dimensional type image including ridges and valleys. However, in the spacing between the ridge and the valley, it may be seen that the spacing of the image 840 is the narrowest and the spacing of the image 860 is relatively widest. A waveform, a symmetrical shape, and/or whether a slope is formed of the generated graph may be different depending on the spacing between the ridge and the valley. The processor 540 may determine whether an authentication-attempted sample matches a user's fingerprint stored in a memory (e.g., the memory 550 of FIG. 5) using a waveform, a symmetrical shape, and/or whether a slope of the generated graph is formed.

FIG. 8C illustrates samples in which the direction of the ridge of the image sample is different from that of the light irradiation direction.

Image 870 illustrates a case where the direction of the ridge of the sample coincides with the direction of light irradiation. In this case, it may be identified that the cross section data of the generated image is almost straight.

Image 880 illustrates a case where the direction of the ridge of the sample and the direction of light irradiation are close to about 45 degrees. In this case, it may be identified that the cross section data of the generated image is asymmetric.

Image 890 illustrates a case where the direction of the ridge of the sample and the direction of light irradiation are close to about 90 degrees. In this case, it may be identified that the cross section data of the generated image is asymmetric. In addition, it may be identified that the cross section data of the generated image forms a slope. The processor 540 may determine whether an authentication-attempted sample matches a user's fingerprint stored in a memory (e.g., the memory 550 of FIG. 5) using a waveform, a symmetrical shape, and/or a slope of the generated graph. According to an embodiment, the memory 550 may store a table in which shading occurs in depth, spacing, and angle of the fingerprint in the process of processing. Based on this data, the processor 540 may store the user's fingerprint information (e.g., depth, direction, spacing, etc.) in the memory 550 when registering the user's fingerprint, and may compare it with the fingerprint image measured later.

FIG. 9 illustrates a shape of a light source according to an embodiment of the disclosure.

Referring to FIG. 9, at least one surface of an active area 910 (e.g., active area 610 of FIG. 6) of an electronic device (e.g., electronic device 500 of FIG. 5) may coincide with at least one surface of an area 920 irradiated by the light source (e.g., a light source 530 of FIG. 5). The matching surfaces may form a first area (e.g., the first area 601 of FIG. 6). In the first area 601, the light source 530 may irradiate in a designated direction as mentioned in FIG. 6, and an image including shading generated in the irradiation direction of the light source 530 may be obtained.

According to one embodiment, the area 920 irradiated by the light source may have a broad spectrum along the Z-axis, but the area 920 irradiated by the light source mentioned in this disclosure may be located on a plane on which the user's fingerprint (sample) is placed based on the Z-axis. One surface or one vertex of the area 920 and the active area 910 may coincide on a plane on which the user's fingerprint (sample) is placed.

According to an embodiment, the first area 601 may be used as a security performance identification period of the electronic device 500. The first area 601 may include at least one of one surface of the fingerprint sensor (e.g., the fingerprint sensor 520 of FIG. 5), one vertex of the fingerprint sensor 520, each of the four vertices of the fingerprint sensor 520, or each of the four edges of the fingerprint sensor 520.

According to an embodiment, the fingerprint recognition area may include the irradiation area 920 irradiated by the light source 530. The processor (e.g., processor 540 in FIG. 5) may also generate a fingerprint image in the remaining fingerprint recognition area (e.g., the second area 602 of FIG. 6) except for the first area 601. The processor 540 may determine whether the user's fingerprint stored in the memory (e.g., the memory 550 of FIG. 5) matches the first image on the first area 601 and the second image on the remaining fingerprint recognition area (e.g., the second area 602).

FIG. 10 is a flowchart illustrating a registration operation of a method of obtaining fingerprint information of an electronic device according to an embodiment of the disclosure.

The illustrated method 1000 may be executed by the electronic device (e.g., the electronic device 500 of FIG. 5) described above with reference to FIGS. 1 to 9, and the technical features described above will be omitted below.

In operation 1010, the processor (e.g., processor 540 of FIG. 5) may detect when the user's finger is positioned on the fingerprint sensor (e.g., fingerprint sensor 520 of FIG. 5). In operation 1012, the processor 540 may irradiate light toward the user's finger using the light source 530 and obtain reflected light.

In operation 1014, the processor 540 may measure the fingerprint image using the obtained reflected light. The processor 540 may generate the form of a fingerprint image 640 by analyzing the reflected light collected by the image sensor (e.g., image sensor 630 of FIG. 6) through the lens (e.g., lens 621 of FIG. 6). Specifically, the processor 120 may detect a difference in the degree of reflection of light generated from ridges and valleys of the fingerprint by using focusing elements such as the lens 621. The processor 540 may detect and distinguish a difference in light collected in each pixel of the image sensor 630, and may convert the difference into a shape of a ridge and a valley to obtain an image of a fingerprint. The difference in the degree of reflection according to the characteristics of the ridge and valley on the fingerprint may act as an important component for making a difference in the fingerprint image generated by the processor 540.

In operation 1016, the processor 540 may measure slopes of ridges and valleys in the irradiation direction of the light source 530 in the first area (e.g., the first area 601 of FIG. 6) based on the obtained fingerprint image.

In operation 1018, the processor 540 may store depth information of the user's fingerprint valley in the memory (e.g., the memory 550 of FIG. 5) based on information on the slope of the fingerprint image, the angle with the ridge and/or the spacing between the ridges.

According to an embodiment, the electronic device 500 may store calibration data related to the shape of the sample in the memory 550 during the manufacturing process. The calibration data may include information on the depth of the valley of the sample, the angle between the irradiation direction of the light source and the ridge and/or information on a slope of a shading according to information on the spacing between ridges. The processor 540 may extract depth information of a fingerprint valley of a user who is trying to register based on the calibration data. The processor 540 may store the extracted depth information of the user's valley in the memory 550. The stored depth information may be registered as additional information together with the user's fingerprint image.

For example, the processor 540 may store user data related to the fingerprint image in the memory 550. For example, the user data may include at least one of the shape of the user's fingerprint, the depth information of the valley of the fingerprint, the spacing between the valley and the ridge of the fingerprint, the angle of the first area per depth of the valley, the angle of the first area per length of the gap between the ridges, the angle between the valley and ridge of the fingerprint and the irradiation direction of the light source, the shape of cross-section data according to the angle between the valley and ridge of the fingerprint and the irradiation direction of the light source, and the irradiation angle and direction of the light source.

When there is an attempt to recognize a fingerprint of another external object thereafter, the processor 540 may determine whether to release security by comparing with the registered user's fingerprint image and/or stored depth information.

In operation 1020, the processor 540 may display a notification asking the user whether to end the registration of the fingerprint image or continue to register the fingerprint of another location of the corresponding finger. When registering a fingerprint at another location of the corresponding finger, the depth information of the user's fingerprint valley may be stored in the memory 550 by repeating the previous operations 1010 to 1018. Thereafter, when the registration of the fingerprint image is completed, the processor 540 may terminate the registration operation.

Figure 11:
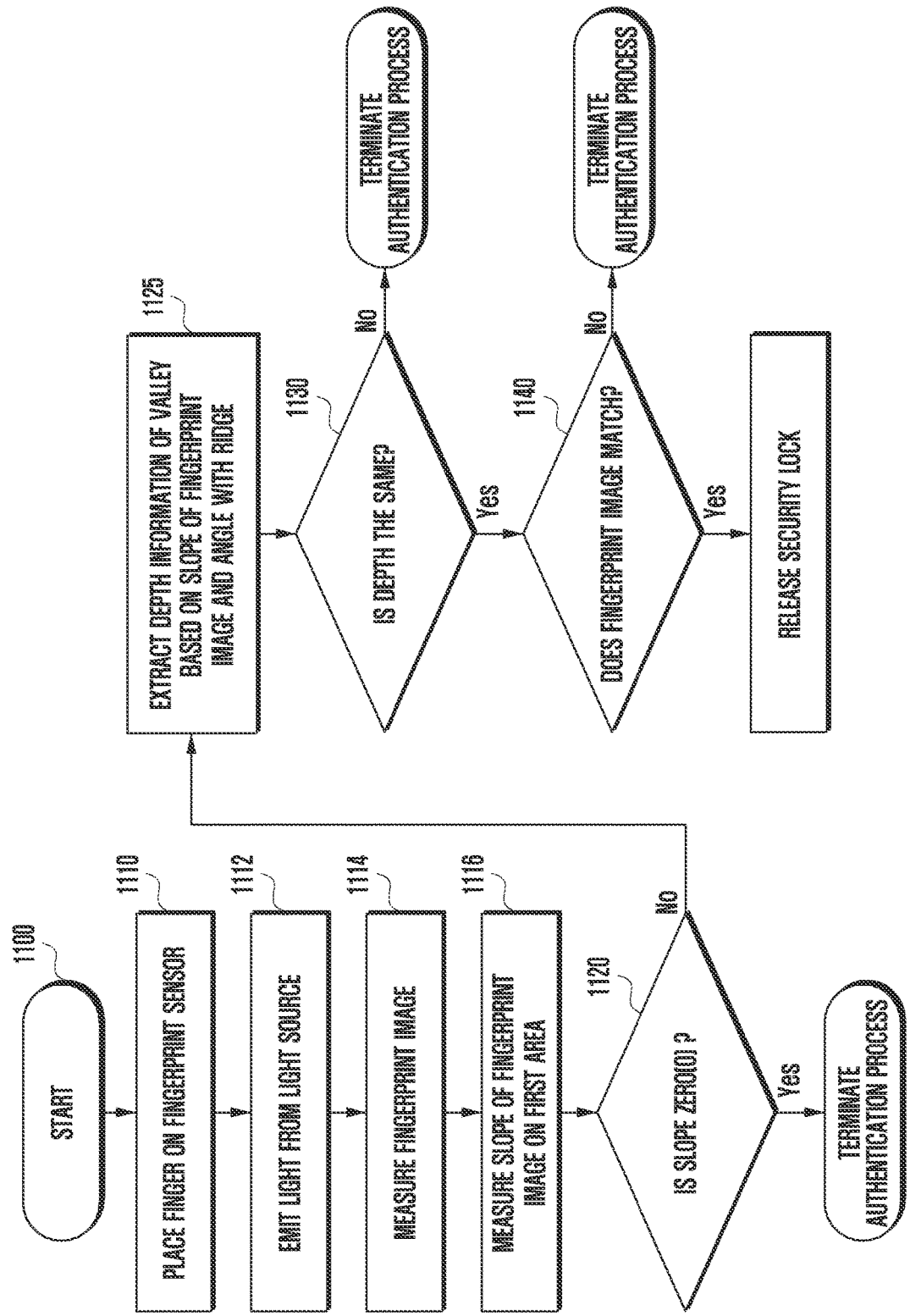
FIG. 11 is a flowchart illustrating an authentication operation of a method of obtaining fingerprint information of an electronic device according to an embodiment of the disclosure.

FIG. 11 is a flowchart illustrating an authentication operation of a method of obtaining fingerprint information of an electronic device according to an embodiment of the disclosure.

The illustrated method 1100 may be executed by the electronic device (e.g., the electronic device 500 of FIG. 5) described above with reference to FIGS. 1 to 9, and the technical features described above will be omitted below.

In operation 1110 similar to the previous FIG. 10, the processor (e.g., processor 540 of FIG. 5) may detect when the user's finger is positioned on the fingerprint sensor (e.g., fingerprint sensor 520 of FIG. 5). In operation 1112, the processor 540 may irradiate light toward the user's finger using the light source 530 and obtain reflected light.

In operation 1114, the processor 540 may measure the fingerprint image using the obtained reflected light. The processor 540 may generate the form of a fingerprint image 640 by analyzing the reflected light collected by the image sensor (e.g., image sensor 630 of FIG. 6) through the lens. Specifically, the processor 120 may detect a difference in the degree of reflection of light generated from ridges and valleys of the fingerprint by using focusing elements such as the lens.

The processor 540 may detect and distinguish a difference in light collected in each pixel of the image sensor 630, and may convert the difference into a shape of a ridge and a valley to obtain an image of a fingerprint. The difference in the degree of reflection according to the characteristics of the ridge and valley on the fingerprint may act as an important component for making a difference in the fingerprint image generated by the processor 540.

In operation 1116, the processor 540 may measure slopes of fingerprint images in the first area (e.g., the first area 601 of FIG. 6) based on the obtained fingerprint image.

In operation 1120, when the slope of the fingerprint image is close to 0, the processor 540 may determine that the sample has a two-dimensional shape. As described above with reference to FIGS. 2 to 3, in the electronic device according to the comparative example, it is difficult to distinguish whether the sample used for fingerprint recognition has a three-dimensional shape with a real user's finger or a two-dimensional shape printed on paper. The electronic device 500 according to various embodiments of the disclosure may measure the slope of the fingerprint image and may determine that the sample attempting authentication has a two-dimensional shape when the slope is close to 0, and may determine that the sample attempting authentication has a three-dimensional shape when the slope is not 0. In operation 1120, when the slope of the fingerprint image is close to 0, the processor 540 may determine that the sample has a two-dimensional shape and the sample is not the user's finger, and terminate the authentication operation. In addition, in operation 1120, when the slope of the fingerprint image is not 0, in operation 1125, the processor 540 may extract depth information of the user's fingerprint valley on the sample based on information on the slope and the angle with the ridge of the fingerprint image.

In operation 1130, the processor 540 may compare the user's fingerprint information stored in the memory 550 with the depth information of a user's fingerprint valley on a newly extracted sample to determine whether the depths of both are the same. When the depths of the two are different, the processor 540 may determine that the sample used for authentication is different from the user's finger and terminate the fingerprint authentication operation. The processor 540 may compare the user's fingerprint information stored in the memory 550 with the depth information of a user's fingerprint valley on the newly extracted sample, and if the depths are the same, determine whether the fingerprint images match in operation 1140. The processor 540 may irradiate light in a direction designated in the fingerprint recognition area using the light source 530 to obtain the first image generated in the irradiation direction of the light source 530 on the first area 601 and the second image generated in the remaining fingerprint recognition area (e.g., the second area 602 of FIG. 6). The processor 540 may determine whether the shape of the sample is two-dimensional or three-dimensional by using the first image generated in the irradiation direction of the light source 530 on the first area 601, and may determine whether the sample matches the user's fingerprint stored in the memory 550 by using at least one of the second image or the fingerprint image 640 including the first area 601 and the second area 602. When the user's fingerprint image stored in the memory 550 and the recognized fingerprint image are the same, the processor 540 may release the security lock of the electronic device 500. For example, as a result of comparing the user's fingerprint image (or user data) stored in the memory 550 and the recognized (or obtained) fingerprint image (e.g., the first image and the second image), the processor 540 may release the security of the electronic device 500 when the similarity is greater than or equal to a preset first level. When the user's fingerprint image stored in the memory 550 and the recognized fingerprint image are not the same, the processor 540 may determine that the recognized sample is different from the user's finger registered in the memory 550 and terminate the fingerprint authentication operation. For example, as a result of comparing the user's fingerprint image (or user data) stored in the memory 550 and the recognized (or obtained) fingerprint image (e.g., the first image and the second image), the processor 540 may terminate the fingerprint recognition operation when the similarity is less than the preset first level.

Figure 12A:
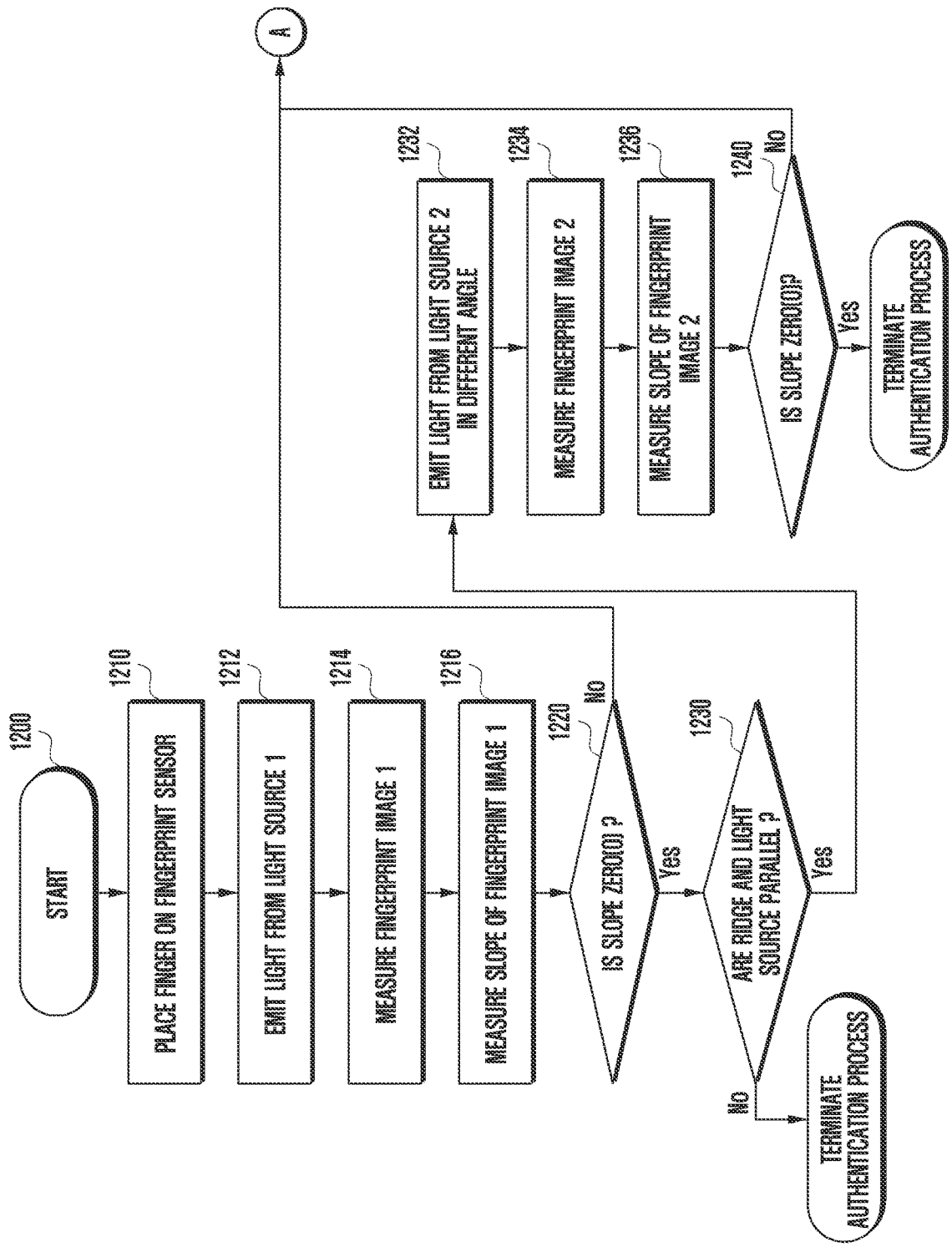
FIGS. 12A and 12B are flowcharts illustrating an authentication operation of a method of obtaining fingerprint information of an electronic device according to various embodiments of the disclosure.
Figure 12B:
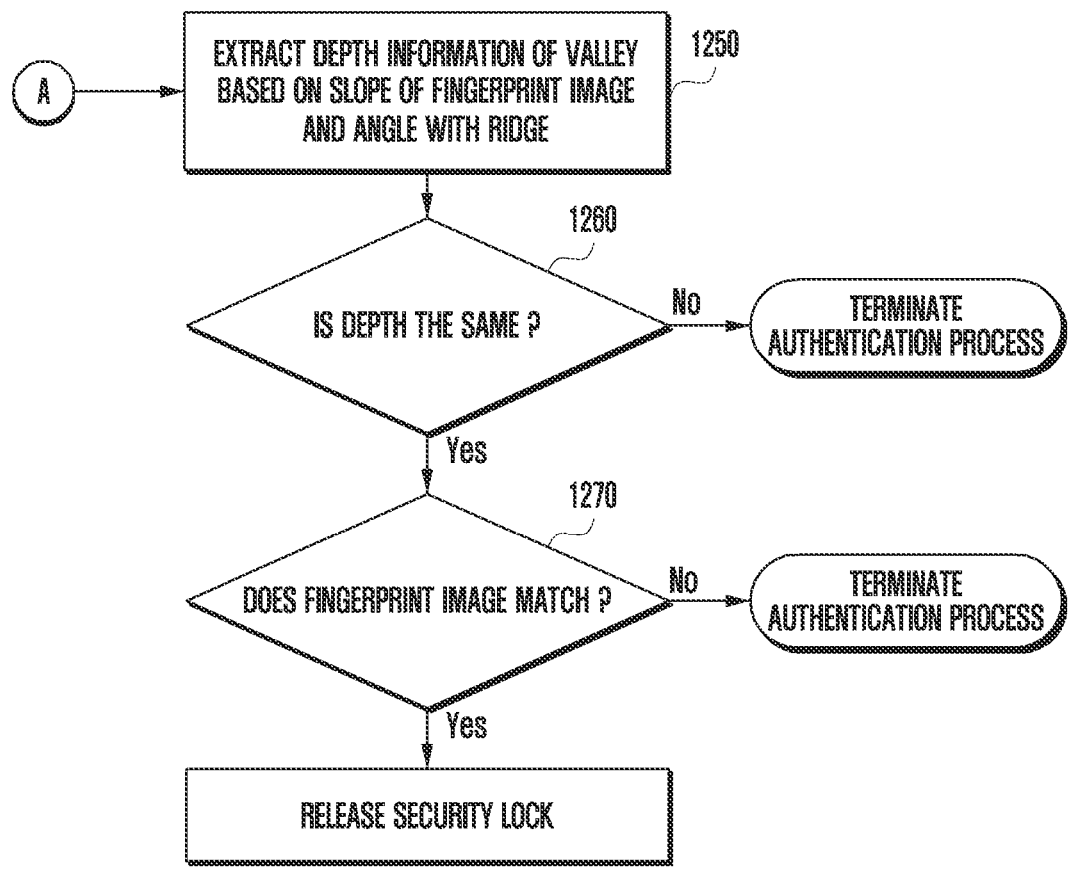

FIGS. 12A and 12B are flowcharts illustrating an authentication operation of a method of obtaining fingerprint information of an electronic device according to various embodiments of the disclosure.

The illustrated method 1200 may be executed by the electronic device (e.g., the electronic device 500 of FIG. 5) described above with reference to FIGS. 1 to 9, and the technical features described above will be omitted below.

Operations 1210 to 1220 illustrated in FIG. 12A may be similar to or identical to the operations 1110 to 1120 illustrated in FIG. 11. In the case of FIG. 11, the processor 540 may immediately terminate the authentication operation after determining whether the slope of the recognized fingerprint image is 0 in operation 1120. However, in the case of FIG. 12A, in operation 1220, after determining whether the slope of the recognized fingerprint image is 0, the processor 540 may additionally perform operation 1230 even if the slope of the fingerprint image is 0.

In operation 1230, when a ridge on the fingerprint image is parallel to the irradiation direction of the light source 530, the processor 540 may change the irradiation angle of the light source 530 to another angle in operation 1232. According to an embodiment, when a ridge on the fingerprint image is coincidentally parallel to the irradiation direction of the light source 530, the slope on the fingerprint image may be close to zero even when the sample forming the fingerprint image has a three-dimensional shape. According to FIG. 11, the processor 540 may terminate the fingerprint authentication operation when the slope of the fingerprint image is close to 0 even though the sample forming the fingerprint image has a three-dimensional shape. The processor 540 may block the possibility of terminating the authentication operation by determining that the measured sample as two-dimensional even though the sample is three-dimensional measured by determining whether a ridge on the fingerprint image is parallel to the irradiation direction of the light source 530 even when the slope on the fingerprint image is close to 0. In addition, when it is determined whether the ridges on the fingerprint image are parallel to the irradiation direction of the light source 530, it is not parallel, the processor 540 may determine that the authenticated sample has a two-dimensional form and terminate the fingerprint authentication operation.

When a ridge on the fingerprint image is parallel to the irradiation direction of the light source 530, the processor 540 may change the irradiation angle of the light source 530 to another angle in operation 1232. In this case, the processor 540 may control the light source 530 to irradiate light in a direction that is not parallel to the ridge with reference to the fingerprint image formed from the authenticated sample. When the irradiation angle of the light source 530 is changed, in operation 1234, the processor 540 may obtain a new fingerprint image different from that of operation 1214. In operation 1236, the processor 540 may measure a slope on the fingerprint image newly obtained in operation 1234. When the slope of the newly obtained fingerprint image is close to 0 in operation 1240, the processor 540 may terminate the fingerprint authentication operation. When the slope of the newly obtained fingerprint image is not 0 in operation 1240, the processor 540 may extract information on depth of a valley based on information on a slope of the fingerprint image and angle information with a ridge in operation 1250.

In operation 1260, the processor 540 may compare the user's fingerprint information stored in the memory 550 with information on the depth of a valley on the newly extracted sample to determine whether the depths of the two are the same. When the depths of the two are different, the processor 540 may determine that the sample used for authentication is different from the user's finger and terminate the fingerprint authentication operation. The processor 540 may compare the user's fingerprint information stored in the memory 550 with the depth information of the user's fingerprint valley on the newly extracted sample, and if the depths are the same, determine whether the fingerprint images match in operation 1270. The processor 540 may determine whether the shape of the sample is two-dimensional or three-dimensional using the image on the first area 601 of FIG. 6, and may determine whether the image of the fingerprint matches by using at least one of the image on the second area 602 of FIG. 6 or the fingerprint image 640 including the first area 601 and the second area 602. When the user's fingerprint image stored in the memory 550 and the recognized fingerprint image are the same, the processor 540 may release the security lock of the electronic device 500. When the user's fingerprint image stored in the memory 550 and the recognized fingerprint image are not the same, the processor 540 may determine that the recognized sample is different from the user's finger registered in the memory 550 and terminate the fingerprint authentication operation.

According to various embodiments, a fingerprint recognition method of an electronic device may include irradiate light in a designated direction to a fingerprint recognition area using a light source, obtaining a first image generated in the irradiation direction of the light source on a first area and a second image generated in the remaining fingerprint recognition area, analyzing the first image to distinguish whether the object detected by the fingerprint sensor is flat or three-dimensional, and comparing the user data stored in a memory in advance with the obtained second image or comparing the user data stored in the memory in advance with a fingerprint image including the first image and the second image to detect whether the object detected by the fingerprint sensor matches a fingerprint of a designated user, when the object detected by the fingerprint sensor is a three-dimensional object.

According to an embodiment, the fingerprint recognition method of an electronic device may further include comparing the user data stored in the memory in advance with the obtained second image or a fingerprint image including the first image and the second image to release the security of the electronic device when the object detected by the fingerprint sensor matches the fingerprint of a designated user.

According to an embodiment, the user data stored in the memory in advance may include at least one of a shape of the user's fingerprint, valley depth information of the user's fingerprint, a spacing between the valley and the ridge of the user's fingerprint, an angle of the first area according to the depth of the valley, an angle of the first area by the spacing length of the ridge, an angle between the valley and the ridge of the user's fingerprint and the irradiation direction of the light source, a shape of cross-section data according to the angle between the valley and ridge and the irradiation direction of the light source, and an irradiation angle and direction of the light source.

According to an embodiment, the detecting whether the object detected by the fingerprint sensor matches the fingerprint of a designated user may include terminating the fingerprint recognition operation when the user data stored in the memory in advance and the obtained first image have a similarity less than a preset first level as a result of comparison.

According to an embodiment, the detecting whether the object detected by the fingerprint sensor matches the fingerprint of a designated user may include releasing the security of the electronic device when the user data stored in the memory in advance and the obtained second image or a fingerprint image including the first image and the second image have a similarity level greater than or equal to the preset first level as a result of comparison.

According to an embodiment, the analyzing the first image to determine whether the object detected by the fingerprint sensor is flat or three-dimensional may include determining that the object recognized by the fingerprint sensor is three-dimensional when the first image includes shading, and determining that the object recognized by the fingerprint sensor is flat when the first image does not include shading.

According to an embodiment, the determining that the object recognized by the fingerprint sensor is three-dimensional when the first image includes shading may further include comparing the user data stored in the memory in advance and the obtained first image to determine whether the object detected by the fingerprint sensor matches the fingerprint of a designated user.

According to an embodiment, the determining that the object recognized by the fingerprint sensor is flat when the first image does not include shading may further include terminating the fingerprint recognition operation of the electronic device.

According to an embodiment, the determining the object recognized by the fingerprint sensor is three-dimensional when the first image includes shading may further include identifying whether the irradiation direction of the light source and the ridge of the user's fingerprint are parallel.

According to an embodiment, the identifying whether the irradiation direction of the light source and the ridge of the user's fingerprint are parallel may further include determining that the object recognized by the fingerprint sensor is flat when the irradiation direction of the light source and the ridge of the user's fingerprint are not parallel, and configuring the irradiation direction of the light source to be in a direction not parallel to the ridge of the user's fingerprint when the irradiation direction of the light source and the ridge of the user's fingerprint are parallel.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device configured to perform a fingerprint recognition operation, the electronic device comprising:
    a light source;
    a fingerprint sensor;
    a memory configured to record an image of a reflected light detected when the light source is turned on; and
    a processor operatively coupled to the light source, the fingerprint sensor, and the memory,
    wherein the light source forms an irradiation area on a display surface by light irradiation to a display,
    wherein the irradiation area includes a fingerprint recognition area formed on the display, and at least one surface matches the fingerprint recognition area or at least one vertex coincides,
    wherein the matched area forms a first area, and
    wherein the memory stores instructions configuring the processor to:
        irradiate light in a designated direction to the fingerprint recognition area using the light source, obtain a first image generated in the irradiation direction of the light source on the first area and a second image generated in a remaining fingerprint recognition area, analyze the first image to distinguish whether an object detected by the fingerprint sensor is flat or three-dimensional, and compare user data stored in the memory in advance with the second image or compare the user data stored in the memory in advance with a fingerprint image including the first image and the second image to detect whether the object detected by the fingerprint sensor matches a fingerprint of a designated user, in response to the object detected by the fingerprint sensor being three-dimensional.

2. The electronic device of claim 1, wherein the memory stores instructions for controlling the processor to compare the user data stored in the memory in advance with the obtained second image or a fingerprint image including the first image and the second image to release security of the electronic device in response to the object detected by the fingerprint sensor matching the fingerprint of a designated user.

3. The electronic device of claim 2, wherein the user data stored in the memory in advance includes at least one of:
a shape of the fingerprint of the designated user;
valley depth information of the fingerprint of the designated user;
a spacing between a valley and a ridge of the fingerprint of the designated user;
an angle of the first area according to the depth of the valley;
an angle of the first area by a spacing length of the ridge;
an angle between the valley and the ridge of the fingerprint of the designated user and the irradiation direction of the light source;
a shape of cross-section data according to the angle between the valley and ridge and the irradiation direction of the light source; or
an irradiation angle and direction of the light source.

4. The electronic device of claim 2, wherein the memory stores instructions further controlling the processor to:
terminate the fingerprint recognition operation in response to the user data stored in the memory in advance and the obtained second image or a fingerprint image including the first image and the second image have a similarity lower than a preset first level as a result of comparison; and
release the security of the electronic device in response to the user data stored in the memory in advance and the obtained first image and the second image having a similarity greater than or equal to a preset first level as a result of comparison.

5. The electronic device of claim 1, wherein the first area includes at least one of one vertex on the fingerprint recognition area overlapping with an emitting area of the light source, a vertex of each of four parts, or each of four sides.

6. The electronic device of claim 1, wherein the processor is further configured to:
determine that the object recognized by the fingerprint sensor is three-dimensional in response to the first image including shading; and
determine that the object recognized by the fingerprint sensor is flat in response to the first image not including shading.

7. The electronic device of claim 6, wherein the memory stores instructions further controlling the processor to terminate the fingerprint recognition operation in response to it being determined that the object detected by the fingerprint sensor is flat as a result of analyzing the first image.

8. The electronic device of claim 6, wherein the memory stores instructions further controlling the processor to compare the user data stored in the memory in advance with the obtained second image or a fingerprint image including the first image and the second image to determine whether the object detected by the fingerprint sensor matches the fingerprint of a designated user, in response to it being determined that the object detected by the fingerprint sensor is three-dimensional as a result of analyzing the first image by the processor.

9. The electronic device of claim 6, wherein the memory stores instructions further controlling the processor to identify whether the irradiation direction of the light source and a ridge of the fingerprint of the designated user are substantially parallel to each other, in response to it being determined that the object detected by the fingerprint sensor is flat as a result of analyzing the first image by the processor.

10. The electronic device of claim 9, wherein the memory stores instructions further controlling the processor to determine that the object recognized by the fingerprint sensor is flat in response to the irradiation direction of the light source and the ridge of the fingerprint of the designated user not being substantially parallel, and configure the irradiation direction of the light source to be non-parallel to the ridge of the fingerprint of the designated user in response to the irradiation direction of the light source being substantially parallel to the ridge of the fingerprint of the designated user.

11. A fingerprint recognition method of an electronic device, comprising:
using a light source to form an irradiation area on a display surface of a display by light irradiation to the display,
wherein the irradiation area includes a fingerprint recognition area formed on the display, and at least one surface matches the fingerprint recognition area or at least one vertex coincides,
wherein the matched area forms a first area, and
wherein the fingerprint recognition method of the electronic device further comprises:
irradiating light in a designated direction to the fingerprint recognition area using the light source,
obtaining a first image generated in the irradiation direction of the light source on the first area and a second image generated in a remaining fingerprint recognition area,
analyzing the first image to distinguish whether an object detected by a fingerprint sensor is flat or three-dimensional, and
comparing user data stored in memory in advance with the second image or comparing the user data stored in the memory in advance with a fingerprint image including the first image and the second image to detect whether the object detected by the fingerprint sensor matches a fingerprint of a designated user, in response to the object detected by the fingerprint sensor being three-dimensional.

12. The fingerprint recognition method of claim 11, further comprising comparing the user data stored in the memory in advance with the obtained second image or a fingerprint image including the first image and the second image to release security of the electronic device in response to the object detected by the fingerprint sensor matching the fingerprint of a designated user.

13. The fingerprint recognition method of claim 12, wherein the user data stored in the memory in advance includes at least one of:
- a shape of the fingerprint of the designated user;
- valley depth information of the fingerprint of the designated user;
- a spacing between a valley and a ridge of the fingerprint of the designated user;
- an angle of the first area according to the depth of the valley;
- an angle of the first area by a spacing length of the ridge;
- an angle between the valley and the ridge of the fingerprint of the designated user and the irradiation direction of the light source;
- a shape of cross-section data according to the angle between the valley and ridge and the irradiation direction of the light source; or
- an irradiation angle and direction of the light source.

14. The fingerprint recognition method of claim 12, wherein the detecting of whether the object detected by the fingerprint sensor matches the fingerprint of a designated user includes terminating a fingerprint recognition operation in response to the user data stored in the memory in advance and the obtained first image having a similarity less than a preset first level as a result of comparison.

15. The fingerprint recognition method of claim 12, wherein the detecting of whether the object detected by the fingerprint sensor matches the fingerprint of a designated user includes releasing the security of the electronic device in response to the user data stored in the memory in advance and the obtained second image or a fingerprint image including the first image and the second image having a similarity level greater than or equal to a preset first level as a result of comparison.

16. The fingerprint recognition method of claim 11, wherein the analyzing of the first image to determine whether the object detected by the fingerprint sensor is flat or three-dimensional includes:
- determining that the object recognized by the fingerprint sensor is three-dimensional in response to the first image including shading; and
- determining that the object recognized by the fingerprint sensor is flat in response to the first image not including shading.

17. The fingerprint recognition method of claim 16, wherein the determining that the object recognized by the fingerprint sensor is three-dimensional in response to the first image including shading further comprises comparing the user data stored in the memory in advance and the obtained first image to determine whether the object detected by the fingerprint sensor matches the fingerprint of a designated user.

18. The fingerprint recognition method of claim 16, wherein the determining that the object recognized by the fingerprint sensor is flat in response to the first image not including shading further comprises terminating a fingerprint recognition operation of the electronic device.

19. The fingerprint recognition method of claim 16, wherein the determining that the object recognized by the fingerprint sensor is three-dimensional in response to the first image including shading further comprises identifying whether the irradiation direction of the light source and a ridge of the fingerprint of the designated user are substantially parallel.

20. The fingerprint recognition method of claim 19, wherein the identifying of whether the irradiation direction of the light source and the ridge of the fingerprint of the designated user are substantially parallel further includes:
- determining that the object recognized by the fingerprint sensor is flat in response to the irradiation direction of the light source and the ridge of the fingerprint of the designated user not being substantially parallel; and
- configuring the irradiation direction of the light source to be in a direction not parallel to the ridge of the fingerprint of the designated user in response to the irradiation direction of the light source and the ridge of the fingerprint of the designated user being substantially parallel.

* * * * *